US011347768B2

(12) United States Patent
Mahbod et al.

(10) Patent No.: US 11,347,768 B2
(45) Date of Patent: May 31, 2022

(54) PARALLEL DATA SYNCHRONIZATION OF HIERARCHICAL DATA

(71) Applicant: Zuora, Inc., Redwood City, CA (US)

(72) Inventors: Sean Mahbod, Los Altos Hills, CA (US); Liangqi Wang, Pleasanton, CA (US); Junyi Song, San Mateo, CA (US)

(73) Assignee: Zuora, Inc., Redwood City, CA (US)

( * ) Notice: Subject to any disclaimer, the term of this patent is extended or adjusted under 35 U.S.C. 154(b) by 132 days.

(21) Appl. No.: 16/891,072

(22) Filed: Jun. 3, 2020

(65) Prior Publication Data

US 2020/0380013 A1 Dec. 3, 2020

Related U.S. Application Data

(60) Provisional application No. 62/856,708, filed on Jun. 3, 2019.

(51) Int. Cl.
*G06F 16/00* (2019.01)
*G06F 16/27* (2019.01)
*G06F 12/0875* (2016.01)
*G06F 16/28* (2019.01)

(52) U.S. Cl.
CPC .......... *G06F 16/27* (2019.01); *G06F 12/0875* (2013.01); *G06F 16/282* (2019.01); *G06F 2212/1041* (2013.01)

(58) Field of Classification Search
CPC ............................... G06F 16/27; G06F 16/282
See application file for complete search history.

(56) References Cited

U.S. PATENT DOCUMENTS

| 7,805,403 | B2* | 9/2010 | Freedman | G06F 16/178 707/612 |
| 2007/0168535 | A1* | 7/2007 | Ikonen | H04L 67/1095 709/230 |
| 2009/0006489 | A1* | 1/2009 | Ramasubramanian | G06F 16/27 |
| 2011/0246417 | A1* | 10/2011 | Maya | H04L 29/0854 707/610 |

* cited by examiner

*Primary Examiner* — Khanh B Pham
(74) *Attorney, Agent, or Firm* — Sheppard, Mullin, Richter & Hampton LLP

(57) ABSTRACT

A data sync cache is maintained to facilitate syncing of child data objects between a first computing system and a second computing system. Responsive to successful syncing of a parent data object of a child data object by a first sync engine, parent object data sync information indicating that the parent data object was successfully synced is written to the data sync cache. Prior to initiating a sync of the child data object by a second sync engine different from the first sync engine, a cache lookup of the data sync cache is performed to determine if the sync information is contained therein. If the data sync cache includes the sync information, the child data object sync is initiated. In this manner, failed syncs of child data objects are reduced along with the expensive API calls to the second computing system that would otherwise be required to retry failed syncs.

19 Claims, 12 Drawing Sheets

PARALLEL DATA SYNCHRONIZATION OF HIERARCHICAL DATA

CROSS-REFERENCE TO RELATED APPLICATION

This application claims the benefit of U.S. Provisional Patent Application No. 62/856,708, filed on Jun. 3, 2019, the contents of which is incorporated by reference herein.

TECHNICAL FIELD

This disclosure pertains to multi-tenant computing systems, and more particularly, in some example embodiments, to parallel data synchronization of hierarchical data between a multi-tenant computing system and another computing system.

BACKGROUND

In computing systems, the contents of a datastore may need to be copied periodically or on-demand to another datastore. For example, data may need to be synced from a first datastore forming part of a first cloud-based system to a second datastore forming part of a second cloud-based system in scenarios in which each system relies on the data. In some cases, conventional data transfer mechanisms for syncing data from one datastore to another may exhibit varying performance characteristics. This can lead to failed syncs and multiple attempts to re-sync data, which can be costly from a performance perspective. Discussed herein are technical solutions that address these and other technical problems associated with conventional data transfer mechanisms.

SUMMARY

In an example embodiment, a computer-implemented method for syncing data between a first computing system and a second computing system is disclosed. The computer-implemented method includes performing a cache lookup of a data sync cache and determining, based at least in part on the cache lookup, that the data sync cache contains parent data object sync information indicating that a parent data object has been successfully synced from the first computing system to the second computing system. The method further includes retrieving a child data object of the parent data object from a first datastore associated with the first computing system and initiating a sync of the child data object to a second datastore associated with the second computing system.

In an example embodiment, prior to performing the cache lookup of the data sync cache, the method further includes retrieving the parent data object from a third datastore associated with the first computing system, initiating a sync of the parent data object to a fourth datastore associated with the second computing system, determining that the parent data object was successfully synced to the fourth datastore, and writing the parent data object sync information to the data sync cache.

In an example embodiment, the parent data object sync information includes a type identifier indicating a type of the parent data object and a timestamp associated with a most recent modification to the parent data object.

In an example embodiment, the parent data object is a first parent data object, the parent data object sync information is first parent data object sync information, and the cache lookup is a first cache lookup, and the method further includes performing a second cache lookup of the data sync cache for second parent data object sync information indicating that a second parent data object of the child data object has been successfully synced from the first computing system to the second computing system and identifying a cache miss responsive, at least in part, to the second cache lookup, where the cache miss indicates that the second parent data object sync information is not present in the data sync cache.

In an example embodiment, the method further includes retrieving metadata associated with the second parent data object, determining that the metadata indicates that syncing of the second parent data object is not required to successfully sync the child data object, and disassociating a data sync cache lookup reference for the second parent data object from the child data object such that subsequent syncs of the child data object proceed without requiring cache lookups for the second parent data object sync information.

In an example embodiment, the method further includes determining that the child data object was successfully synced to the second datastore and writing child data object sync information to a queue, the child data object sync information including an identifier indicating that the sync of the child data object was a partial sync.

In an example embodiment, the method further includes determining that the second parent data object was successfully synced from the first computing system to the second computing system and removing the child data object sync information from the queue.

In an example embodiment, the method further includes re-associating the data sync cache lookup reference for the second parent data object with the child data object responsive, at least in part, to determining that the second parent data object was successfully synced.

In an example embodiment, the child data object is a first child data object, the parent data object is a first parent data object, and the parent data object sync information is first parent data object sync information, and the method further includes performing one or more cache lookups of the data sync cache for second parent data object sync information indicating that a second parent data object of a second child data object has been successfully synced from the first computing system to the second computing system and determining, responsive, at least in part, to the one or more cache lookups, that a threshold number of cache misses have occurred, each cache miss indicating that the data sync cache does not contain the second parent data object sync information. The method further includes retrieving the second child data object from a third datastore associated with the first computing system responsive, at least in part, to determining that the threshold number of cache misses have occurred, and initiating a sync of the child data object to a fourth datastore associated with the second computing system.

In an example embodiment, the method further includes determining that the second child data object was successfully synced to the fourth datastore and writing the second parent data object sync information to the data sync cache.

In an example embodiment, the method further includes determining that the sync of the second child data object failed and writing child data object sync information to a data structure accessible by the second computing system, the child data object sync information including an identifier indicating that the sync of the second child data object failed.

In an example embodiment, a system configured to perform data syncs is disclosed. The system includes at least one processor and at least one memory storing computer-executable instructions. The at least one processor is configured to access the at least one memory and execute the computer-executable instructions to perform a set of operations including performing a cache lookup of a data sync cache and determining, based at least in part on the cache lookup, that the data sync cache contains parent data object sync information indicating that a parent data object has been successfully synced from the first computing system to the second computing system. The set of operations further includes retrieving a child data object of the parent data object from a first datastore associated with the first computing system and initiating a sync of the child data object to a second datastore associated with the second computing system.

The above-described system is further configured to perform any of the operations/functions and may include any of the additional features/aspects of example embodiments of the invention described above in relation to example computer-implemented methods of the invention.

In an example embodiment, a computer program product for syncing data between a first computing system and a second computing system is disclosed. The computer program product includes a non-transitory computer-readable medium readable by a processing circuit. The non-transitory computer-readable medium stores instructions executable by the processing circuit to cause a method to be performed. The method includes performing a cache lookup of a data sync cache and determining, based at least in part on the cache lookup, that the data sync cache contains parent data object sync information indicating that a parent data object has been successfully synced from the first computing system to the second computing system. The method further includes retrieving a child data object of the parent data object from a first datastore associated with the first computing system and initiating a sync of the child data object to a second datastore associated with the second computing system.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
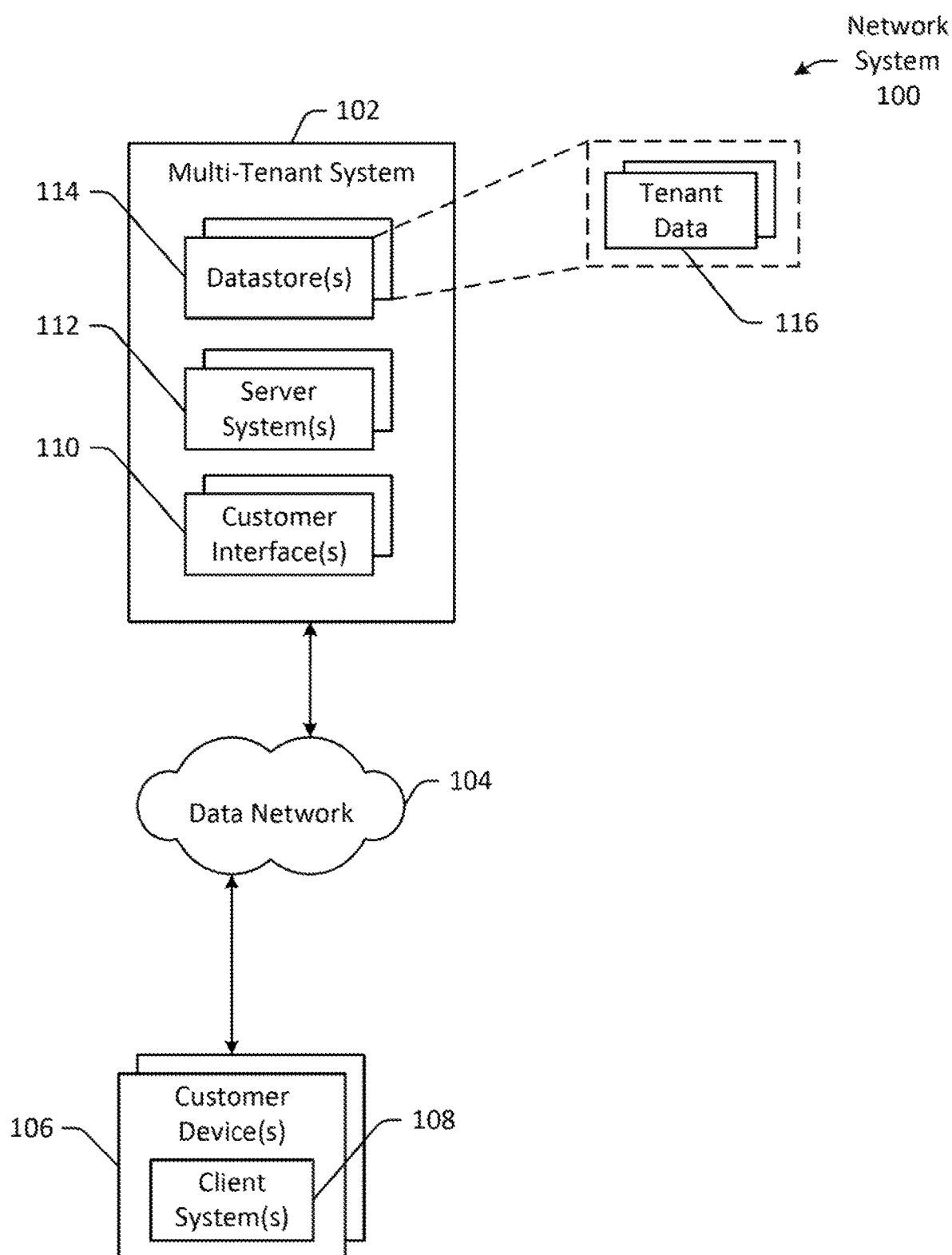
FIG. 1 depicts an example network system configured to provide cloud-based software-as-a-service (SAAS) services of a multi-tenant system to multiple tenants in accordance with example embodiments of the invention.

Multiple disparate computing systems often rely and operate on respective copies of the same dataset. It is therefore important to ensure that different versions of a dataset maintained by different computing systems are up-to-date and synced with one another. Various data transfer mechanisms may be employed to sync data maintained at one computing system with corresponding data maintained at another computing system. Periodic or on-demand syncing of data from one computing system to another computing system ensures that updates made to the data at one computing system are propagated to another computing system and that the systems do not access and/or otherwise rely upon conflicting data.

In some data transfer scenarios, different data transfer mechanisms may be used to transfer/sync different types of data. For example, data may be arranged/organized in a hierarchical manner with parent-child dependencies existing between various data elements. Hierarchically organized data may include, for example, parent data objects and child data objects. A data object, as that term is used herein, may include any discrete data element associated with a data schema, and may be representative, for example, of an entity modeled by the data schema. In the case of a multi-tenant computing system, as described herein, a data object may represent, for example, a tenant, a customer of the tenant, a billing account of a customer of the tenant, a service subscription associated with a billing account, or the like. In the case of hierarchical data, a parent data object may be associated with one or more child data objects via corresponding parent-child dependencies. Similarly, the parent data object may itself may be child data object to one or more other parent data objects. For instance, referring again to an example multi-tenant computing system as described herein, a billing account data object may be a parent data object to each of an invoice child data object and a subscription child data object. The invoice data object may, in turn, be a parent data object to an invoice item child data object. It should be appreciated that these examples are merely illustrative, and that hierarchical data may include any number of parent and child data objects with any number of parent-child dependencies there between.

In some example data transfer scenarios, different data transfer mechanisms with different performance characteristics (e.g., different systems, devices, engines, etc.) may be employed to sync different types of hierarchical data. For instance, a first data transfer mechanism may be used to sync certain parent data objects between a first computing system and a second computing system, and a second data transfer mechanism that has improved performance characteristics over the first data transfer mechanism may be used to sync certain child data objects between the computing systems. For example, the first data transfer mechanism may be a legacy device/system/engine that syncs various parent data objects between computing systems and the second data transfer mechanism may be an enhanced newer data transfer device/system/engine that syncs various child data objects of the parent data objects. The improved performance characteristics of the second data transfer mechanism may include the capability to successfully sync data objects in a shorter period of time than the first data transfer mechanism, a reduced number or percentage of failed sync attempts, or the like.

In example scenarios, due to poorer performance characteristics, a legacy data transfer mechanism may not have completed a sync of a parent data object prior to a newer data transfer mechanism with improved performance characteristics initiating a sync of a child data object of the parent data object. As a result, the sync of the child data object from a first computing system to a second computing system may fail because the child data object depends from the parent data object and requires a successful sync of the parent data object from the first computing system to the second computing system prior to initiating and/or successfully completing syncing the child data object. To address this issue, conventional data transfer techniques repeatedly attempt to sync the child data object until the sync is successful. However, this can involve repeated calls to an application programming interface (API) of the computing system to which the child data object is being synced, which are costly from a performance perspective.

Various embodiments of the invention provide technical solutions that overcome technical problems specifically arising in the realm of computer-based technology, and more specifically, in the realm of data transfer technology, and thus, represent an improvement to computer technology. In particular, example embodiments of the invention provide technical solutions to technical problems that stem from different data transfer mechanisms with different performance characteristics being used to transfer/sync different types of hierarchical data between computing systems. More specifically, example embodiments provide a technical solution that obviates the technical problem of increased performance costs caused by the repeated API calls that are often necessary to successfully sync a child data object when a lower performance data transfer mechanism is being used to sync a parent data object from which the child data object has a dependency relationship.

Example embodiments of the invention provide a technical solution to the aforementioned technical problems of conventional data transfer techniques by providing a data sync cache that maintains sync information for parent data objects that have been successfully synced from a first computing system to a second computing system, and which can be accessed prior to syncing child data objects to ensure that syncs of the child data objects will not fail due to their parent data objects not having already been successfully synced. In example embodiments, a lower performance synchronization engine may be configured to perform syncs of certain parent data objects and a higher performance synchronization engine may be configured to perform syncs of child data objects of the parent data objects. In example embodiments, data objects may be pre-assigned, via a table, mapping, or the like, to either the lower performance synchronization engine or the higher performance synchronization engine for syncing. For instance, in some example embodiments, certain parent data objects may be pre-assigned for syncing by the lower performance synchronization engine, while certain child data objects may be pre-assigned for syncing by the higher performance synchronization engine.

In example embodiments, prior to initiating a sync of a child data object from a first computing system to a second computing system, the higher performance synchronization engine may perform a cache lookup of the data sync cache to attempt to locate parent data object sync information indicating that a parent data object of the child data object has been successfully synced from the first computing system to the second computing system. If a cache hit occurs indicating that the data sync cache contains the parent data object sync information, then the higher performance synchronization engine may retrieve the child data object from a first datastore of the first computing system and initiate a sync of the child data object to a second datastore of the second computing system. While the sync of the child data object may still fail due to other factors (e.g., a loss of connectivity with the second computing system), it can be ensured that the sync of the child data object will not fail due to the parent data object not having been previously synced to the second computing system because parent data object sync information indicating that the parent data object was successfully synced is confirmed to be present in the data sync cache. A cache hit may be described herein as corresponding to the detection/determination of the presence of information in a cache in response to a cache lookup querying the cache for such information. It should be appreciated, however, that in certain example embodiments, a cache hit may occur or otherwise refer to the absence of queried information from a cache. Correspondingly, while a cache miss may be described herein as the absence of queried information from a cache, it should be appreciated that, in certain example embodiments, a cache miss may occur or otherwise refer to the presence of queried information in a cache.

In some example embodiments, parent data object sync information may not be present in the data sync cache despite a corresponding parent data object having been successfully synced to the second computing system. For instance, a most recent sync of the parent data object may have been performed by a lower performance synchronization engine (e.g., a legacy engine) prior to the engine being configured to write to the data sync cache. In such example embodiments, the higher performance synchronization engine may continue to perform cache lookups of the data sync cache until the parent data object sync information is located in the cache or until a threshold number of cache misses occur.

Responsive to reaching the threshold number of cache misses, the higher performance synchronization engine may nonetheless retrieve the child data object and initiate a sync of the child data object. If the sync of the child data object is successful, it can be presumed that the parent data object had already been successfully synced despite the absence of corresponding parent data object sync information in the data sync cache. As such, responsive to successful syncing of the child data object, the higher performance synchronization engine may write parent data object sync information indicating that the parent data object has been successfully synced to the data sync cache. In this manner, subsequent cache lookups for the parent data object sync information would result in cache hits, and syncing of the child data object would proceed accordingly. On the other hand, if the sync of the child data object is not successful, child data object sync information may be written to a failure/partial sync queue. The child data object sync information may include an identifier that indicates that the sync failed. If the sync of the child data object is not successful, it may be presumed that the parent data object was not previously successful synced, and thus, no parent data object sync information may be written to the data sync queue.

As previously noted, a child data object may be associated with multiple parent data objects. In some example embodiments, syncing of a parent data object may not be required in order to successfully sync a child data object of the parent data object. For instance, in some example embodiments, while prior syncing of one or more parent data objects may be required in order to successfully sync a corresponding child data object, prior syncing of one or more other parent data objects of the child data object may not be required to successfully sync the child data object. For instance, in some example embodiments, a sync of a child data object may complete successfully even if a concurrent syncing of a parent data object of the child data object has not completed, or in some cases, has not even been initiated.

In such example embodiments, if a cache miss occurs in response to a cache lookup of the data sync cache, the cache miss indicating that parent data object sync information for a parent data object is not present in the data sync cache, which in turn, indicates that the parent data object has not been successfully synced, then metadata associated with the parent data object may be accessed and analyzed. If the metadata indicates that syncing of the parent data object can be ignored (e.g., is not required for successful syncing of the child data object), the higher performance synchronization engine may retrieve the child data object and initiate a sync of the child data object. If the sync is successful, child data object sync information may be written to the failure/partial sync queue. The child data object sync information may include an identifier that identifies the sync of the child data object as a partial sync. In addition, a data sync cache lookup reference for the parent data object may be disassociated from the child data object. In this manner, subsequent syncs of the child data object may proceed without necessitating a cache lookup of the data sync cache for parent data object sync information corresponding to the parent data object that can be ignored.

It should be appreciated that prior to future syncs of the child data object, one or more cache lookups of the data sync cache may still need to be performed with respect to one or more other parent data objects of the child data object that are required to have been successfully synced as a prerequisite to successful syncing of the child data object. It should further be appreciated that, in some example embodiments, the higher performance synchronization engine may assess respective metadata associated with each parent data object of a child data object prior to performing a cache lookup of the data sync cache in order to identify which parent data object(s) are required to be synced prior to syncing of the child data object and which parent data object(s) can be ignored. Further, in some example embodiments, a parent data object may transition from being a "sync critical" parent data object that must be successfully synced as a prerequisite to successful syncing of a child data object to a "sync non-critical" parent data object whose sync criticality status can be ignored for the purposes of syncing the child object, or vice versa. As such, in response to periodic monitoring of the sync criticality status of a parent data object or in response to an otherwise detected change in the sync criticality status of a parent data object, corresponding metadata may be updated to indicate the change in the sync criticality status. For instance, an identifier, flag, code, or the like can be modified to indicate a change from a sync critical status to a sync non-critical status, or vice versa.

In some example embodiments, the lower performance synchronization engine may successfully sync the ignored parent data object from the first computing system to the second computing system at some point in time subsequent to the partial sync of the child data object. In response to the successful syncing of the ignored parent data object, the child data object sync information previously written to the failure/partial sync queue may be removed from the queue and the cache lookup reference for the now synced parent data object may be re-associated with the child data object. In this manner, future syncs of the child data object would again require cache lookups to the data sync cache for parent data object sync information indicating that the previously ignored parent data object has been successfully synced.

FIG. 1 depicts a diagram of an example network system 100 for providing cloud-based SAAS services of a multi-tenant system 102 to multiple tenants according to some example embodiments. Examples of such cloud-based SAAS services include data storage, data processing, and business-oriented applications. In some example embodiments, each tenant may be a subscription-based entity or provider (e.g., an internet service provider, a home security system and service provider, a cellular phone service provider, an entertainment content provider, etc.). A respective group of one or more users (e.g., individuals, business entities, customers of the business entities, systems, etc.) may share access to the cloud-based services provided to each tenant by the multi-tenant system 102. In some example embodiments, a tenant corresponds to a service entity such as AT&T, Netflix, Verizon, and/or the like. In some example embodiments, a tenant may correspond to one or more products or services offered by an entity. For example, in an example embodiment, AT&T internet products and AT&T security products may be separate and distinct tenants. In some example embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources for hosting the cloud-based SAAS services provided to the tenants. The shared resources may include processors, memory, virtual systems, services, application programs, load balancers, firewalls, and so forth. As depicted in FIG. 1, the multi-tenant system 102 may include tenant interfaces 110, server systems 112, and datastores 114. Each of the client devices 106 may include a client system 108 that accesses the cloud-based SAAS services hosted by the multi-tenant system 102. In example embodiments, the client systems 108 may be operated by employees (e.g., administrator users) of the provider of the multi-tenant system 102; by employees of the tenants; and/or by end users of the tenants' services.

Each client device 106 may include a personal computing device such as a desktop computer, a laptop computer, a notebook, a tablet, a personal digital assistant (PDA), a smartphone, a wearable computing device, and/or any other consumer electronic device incorporating one or more computer components. The client system 108 on each client device 106 may include hardware, software, and/or firmware for communicating with the multi-tenant system 102 and accessing the cloud-based services hosted by the multi-tenant system 102. Examples of the client systems 108 may include, without limitation, web browsers, client engines, drivers, user interface components, proprietary interfaces, and so forth.

The multi-tenant system 102 may include hardware, software, and/or firmware for hosting cloud-based services for tenants. In example embodiments, the multi-tenant system 102 may offer access to shared resources including systems and applications on shared devices and may offer each tenant the same quality or may offer different tenants varying qualities of service. In some example embodiments, the multi-tenant system 102 may not use virtualization or instantiation processes. In some example embodiments, the multi-tenant system 102 may integrate several business computing systems into a common system with a view toward streamlining business processes and increasing efficiencies on a business-wide level.

In some example embodiments, the multi-tenant system 102 includes a user interface tier of multiple tenant interfaces 110, a server tier of multiple server systems 112, and a datastore tier of multiple datastores 114 for the multiple tenants. In some example embodiments, the tenant interfaces 110 may include graphical user interfaces and/or web-based interfaces to enable tenants to access the shared services hosted by the multi-tenant system 102. The tenant interfaces 110 may support load balancing when multiple tenants (and/or multiple customers of the tenants) attempt to access the multi-tenant system 102 concurrently. The tenant interfaces 110 may additionally or alternatively include an operator interface for use by a systems operator to configure or otherwise manage configuration settings or the like the multi-tenant system 102. In some example embodiments, to support load balancing, each tenant may be associated with a subset of the total number of tenant interfaces 110.

In some example embodiments, the server systems 112 may include hardware, software, and/or firmware configured to host the shared services for tenants. The hosted services may include tenant-specific business services or functions, including enterprise resource planning (ERP) services; customer relationship management (CRM) services; eCommerce services; Human Resources (HR) management services; financial services including, for example, payroll services, accounting services, subscription billing services, financial reporting and analysis services, or the like; calendaring services; order processing services; inventory management services; supply chain management (SCM) services; collaboration services; sales force automation (SFA) services; marketing automation services; support services including, for example, contact list management services, call-center support services, web-based customer support services, or the like; partner and vendor management services; product lifecycle management (PLM) services; and so forth. Similar to the tenant interfaces 110, in some example embodiments, the server systems 110 may support load balancing when multiple tenants (and/or multiple customers of tenants) attempt to access the multi-tenant system 102 concurrently. Further, in some example embodiments, each tenant may be associated with a subset of the total number of server systems 112 to support load balancing.

In some example embodiments, tenant data 116 for each tenant may be stored in a logical store across one or more datastores 114. In some example embodiments, each tenant uses a logical store that is not assigned to any predetermined datastores 114. Each logical store may contain tenant data 116 that is used, generated, and/or stored as part of providing tenant-specific business services or functions. In some example embodiments, the datastores 114 may include relational database management systems (RDBMS), object-based database systems, or the like. In some example embodiments, tenant data 116 may be stored across multiple datastores 114, with each datastore dedicated to a particular service (e.g., managing customer records, managing product and/or service consumption information, managing billing information, managing payment information, etc.).

In some example embodiments, the tenant data 116 may include subscription information, such as billing data and/or subscription status data (e.g., active, canceled, suspended, re-activated). Billing data may include billing invoice data (e.g., date of invoices and invoice amounts, overage charge dates and overage charge amounts, etc.); payment transaction data (e.g., date of payments, amount of payments, etc.); payment method data (e.g., stored credit card/debit card information); payment plan data (e.g., annual billing, monthly billing, etc.); and/or service plan data (e.g., the name of a service plan). Subscription information may also include a geographic region and/or location information associated with a tenant, service, and/or subscriber. In some example embodiments, the tenant data 116 may include usage data (e.g., account activity data), such as data identifying new subscriptions; changes to subscribed products and/or services; cancellation of one or more products and/or services; subscriptions to new products and/or services as part of an existing subscription; application of discounts; loyalty program package changes (e.g., additional programs and/or services, special rates, or the like for loyal customers); reduction or increase of rates for products and/or services; and/or cancellation of a subscription. In some example embodiments, account activity data may include data indicative of subscriber product usage data (e.g., what channels the subscriber actually watches, what services and what level of consumption the subscriber receives, quality of the product and/or services, etc.).

In some example embodiments, the tenant data 116 may be stored in one or more data formats according to one or more data schemas. For example, subscription tenant data may be stored in a particular format and usage tenant data may be stored in another format. As used herein, data formats, or simply formats, may include data types; variable types; protocols (e.g., protocols for accessing, storing, and/or transmitting data); programming languages; scripting languages; data value parameters (e.g., date formats, string lengths, etc.); endpoint locations; and so forth. In some example embodiments, the tenant data 116 may be stored as data objects as part of an object-oriented data schema. The tenant data 116 may include parent data objects, where each parent data object is related to one or more child data objects via a parent-child dependency relationship. Any given parent data object may, in turn, be a child data object to one or more other parent data objects. Similarly, any given child data object may, in turn, be a parent data object to one or more other child data objects.

In some example embodiments, the multi-tenant system 102 functions to provide uniform access to disparate services (e.g., microservices) and/or disparate datastores. For example, different services of the multi-tenant system 102 may manage (e.g., create, read, update, delete) tenant data 116 stored in different datastores 114. It will be appreciated that as used herein, a "service" may be single service and/or a set of services (e.g., a cluster of services). The datastores 114 may store data in different formats and/or the services may handle data differently. The services may each include a service provider interface (SPI) that provides data from the service and/or that receives data at the service in a common (or uniform) format, regardless of the original format that may be used by the service and/or datastores 114. In some example embodiments, the multi-tenant system 102 may define a uniform access specification that defines the common format that the services must comport with when receiving and/or providing data. Accordingly, each of the services may be accessed in a uniform manner, and data may be consumed from the services in a uniform manner, regardless of the internal specifications and/or operations of the service.

The data/communication network 104 may represent one or more types of computer networks (e.g., a local area network (LAN), a wide area network (WAN), etc.) and/or underlying transmission media. The data network 104 may provide communication between the systems, engines, datastores, components, and/or devices described herein. In some example embodiments, the data network 104 includes one or more computing devices, routers, cables, buses, and/or other network topologies (e.g., mesh network topologies). In some example embodiments, the data network 104 may include one or more wired and/or wireless networks. In various example embodiments, the data network 104 may include the Internet, one or more WANs, one or more LANs, and/or one or more other public, private, Internet Protocol (IP)-based, and/or non-IP-based networks.

Figure 2:
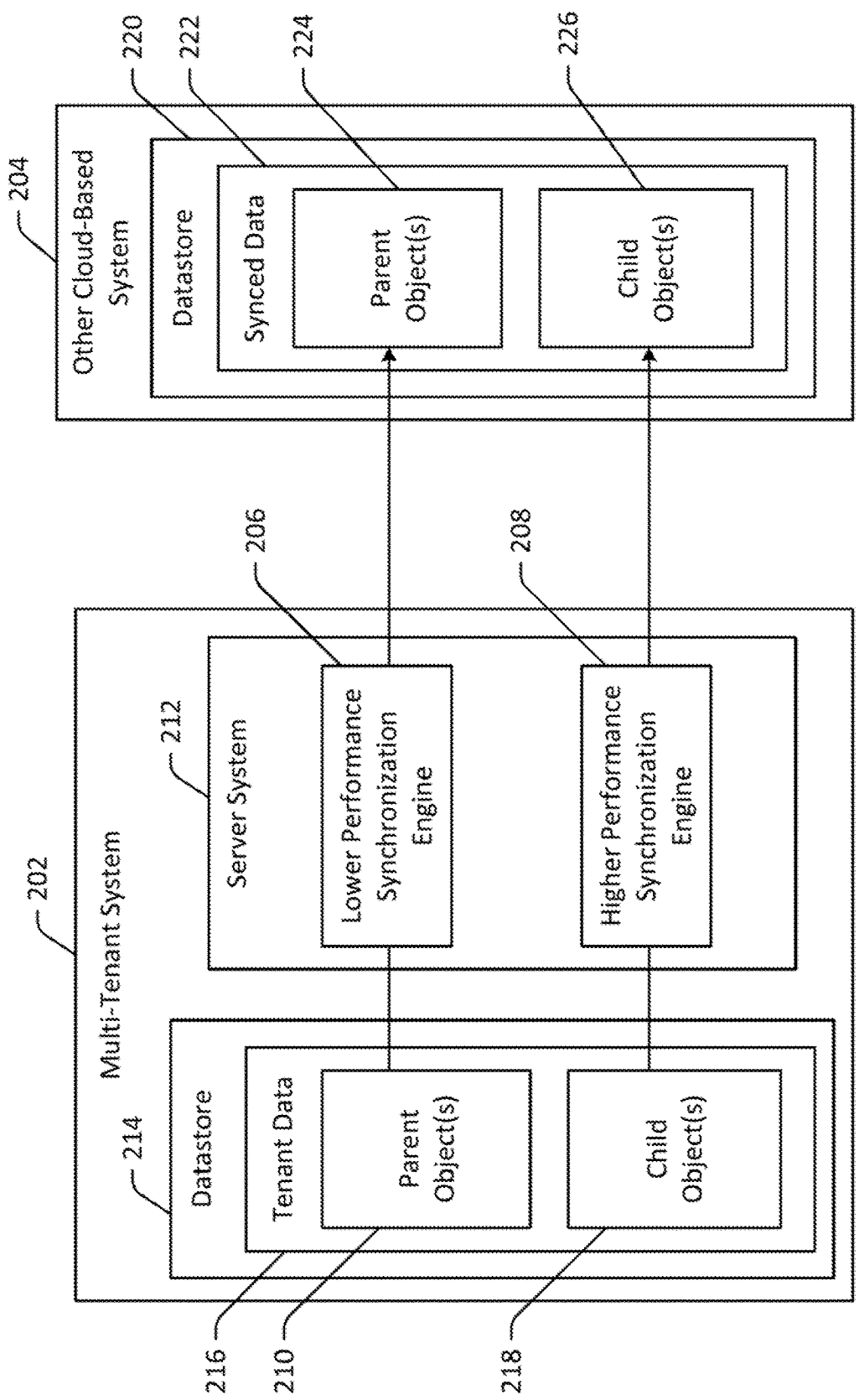
FIG. 2 depicts an example data syncing process between a multi-tenant system and another cloud-based computing system in accordance with example embodiments of the invention.

FIG. 2 depicts an example data syncing process between a multi-tenant system 202 and another cloud-based computing system 204 in accordance with example embodiments of the invention. The multi-tenant system 202 may be a particular implementation of the multi-tenant system 102. The other cloud-based system 204 may be integrated with the multi-tenant system 202 such that tenant data 216 hosted at the multi-tenant system 202 is shared/synced with the other cloud-based computing system 204. For instance, both the multi-tenant system 202 and the other cloud-based system 204 may each provide cloud-based services to one or more of the same tenants, and as such, may each host and operate on the same tenant data 216. In example embodiments, the tenant data 216 may represent at least a portion of the tenant data 116. The tenant data 216 may be stored in one or more datastores 214, which may represent at least a portion of the datastore(s) 114.

In example embodiments, the tenant data 216 may include one or more parent data objects 210 and one or more child data objects 218. For instance, at least a portion of the tenant data 216 may be organized as hierarchical data according to an object-oriented data schema in which data elements may be represented as data objects having parent-child dependencies there between. In example embodiments, each parent data object 210 may be related to one or more of the child data objects 218 via respective parent-child dependencies. In some example embodiments, the intersection of the set of parent data objects 210 and the set of child data objects 218 may be non-null. That is, in example embodiments, one or more of the parent data objects 210 may themselves be child data object(s) 218 to one or more other parent data objects 210. Similarly, one or more child data objects 218 may, in turn, also be parent data object(s) 210 to one or more other child data objects 218.

In connection with example embodiments in which at least a portion of the tenant data 216 represents subscription service-based data, an example parent data object 210 may be a billing account data object. For example, each customer of a tenant of the multi-tenant system 202 may be represented by, or otherwise associated with, a billing account data object. The billing account data object may be a parent data object 210 to various child data objects 218 such as, for example, an invoice data object and a subscription data object. The invoice data object may represent a collection of all invoice data corresponding to the parent billing account data object. The subscription data object may include subscription data (e.g., subscription term, products/services included in the subscription, etc.) associated with the billing account data object. The invoice data object and/or the subscription data object may, in turn, be parent data objects 210 to one or more other child data objects 218. For example, the invoice data object may be a parent data object to an invoice item data object. The invoice item data object may represent, for example, one or more invoices generated in connection with the billing account data object. It should be appreciated that the above examples of parent and child data objects are merely illustrative and not exhaustive.

In example embodiments, one or more data transfer engines may be configured to sync the tenant data 216 from the multi-tenant system 202 to the other cloud-based system 204 periodically according to a predetermined sync schedule. In other example embodiments, the tenant data 216 may be synced from the multi-tenant system 202 to the other cloud-based system 204 responsive to updates being made to the tenant data 216. In some example embodiments, updates to the tenant data 216 may be batched and synced to the other cloud-based system 204 after a threshold number of updates are made and/or after a threshold amount of the tenant data 216 has been updated. In other example embodiments, the tenant data 216 may be synced to the other cloud-based system 204 on-demand responsive to a request received from the other cloud-based system 204.

In some example embodiments, different engines with different performance characteristics may be employed to sync different portions of the tenant data 216 based on their parent-child relationships. For instance, in some example embodiments, a lower performance synchronization engine 206 may be used to sync at least a portion of the parent data objects 210, and a higher performance synchronization engine 208 may be used to sync at least a portion of the child data objects 218. Because, as previously noted, there may be some overlap between the set of parent data objects 210 and the set of child data objects 218, in some example embodiments, the lower performance synchronization engine 206 may sync one or more of the child data objects 218 (which may also be parent data objects 210), and the higher performance synchronization engine 208 may sync one or more of the parent data objects 210 (which may also be child data objects 218).

In example embodiments, data objects may be pre-assigned, via a table, mapping, or the like, to either the lower performance synchronization engine 206 or the higher performance synchronization engine 208 for syncing. For instance, in some example embodiments, certain parent data objects 210 may be pre-assigned for syncing by the lower performance synchronization engine 206, while certain child data objects 218 may be pre-assigned for syncing by the higher performance synchronization engine 208. In some example embodiments, syncing responsibility for parent data objects 210 may be progressively migrated from the lower performance synchronization engine 206 to the higher performance synchronization engine 208. For instance, if the number of child data objects 218 that depend from a parent data object 210 increases beyond a threshold number, responsibility for syncing the parent data object 210 may be migrated from the lower performance synchronization engine 206 to the higher performance synchronization engine 208.

The lower performance synchronization engine 206 may be, for example, a legacy engine that exhibits poorer performance characteristics (e.g., slower data transmission rates, higher sync failure rates, etc.) than the higher performance synchronization engine 208. In example embodiments, the lower performance synchronization engine 206 and the higher performance synchronization engine 208 may execute on a server system 212, which may be comprised of one or more of the server systems 112. While depicted as executing on the same server system 212, in some example embodiments, the engine 206 and the engine 208 may execute on different server systems and/or one or both of the engines 206, 208 may execute in a distributed manner across multiple server systems.

In example embodiments, the lower performance synchronization engine 206 may sync parent data objects 210 from the multi-tenant system 202 to the other cloud-based system 204. After being successfully synced over, the parent data objects 210 may be stored as parent data objects 224 in one or more datastores 220 residing on the other cloud-based system 204. Further, in example embodiments, the higher performance synchronization engine 208 may sync child data objects 218 from the multi-tenant system 202 to the other cloud-based system 204. After being successfully synced over, the child data objects 218 may be stored as child data objects 226 in the datastore(s) 220. It should be appreciated that at least some of the parent data objects 210 may be stored in one or more different datastores than the child data objects 218. Similarly, at least some of the parent data objects 224 may be stored in one or more different datastores than the child data objects 226. The synced parent data objects 224 and the synced child data objects 226 may form at least part of data 222 synced over to the other cloud-based system 204 from the multi-tenant system 204.

In example embodiments, the lower performance synchronization engine 206 and/or the higher performance synchronization engine 208 may make an API call to the other cloud-based system 204 to initiate a sync of a data object. Further, in some example embodiments, a child data object 218 may only be successfully synced over to the other cloud-based system 204 if one or more parent data objects 210 of the child data object 218 have already been successfully synced over. If the lower performance synchronization engine 206 has not initiated a sync of a parent data object 210 or is still in the process of syncing over the parent data object 210 when the higher performance synchronization engine 208 attempts to initiate a sync of a child data object 218 of the parent data object, then the sync of the child data object 218 may fail. In some example embodiments, a sync of a child data object 218 may be successfully initiated even if a sync of a parent data object 210 of the child data object 218 is in progress and has not successfully completed yet, but the child data object 218 may ultimately fail when a point is reached where the dependency of the child data object 218 on the parent data object 210 requires data from the parent data object 210 that has not yet been synced over in order to continue syncing the child data object 218. This scenario could present itself because the parent data object 210 may sync more slowly than the child data object 218 due to the poor performance characteristics of the engine 206 as compared to the engine 208.

To address the possibility of failure of a child data object 218 sync due to the failure of a parent data object 210 to have already been successfully synced, conventional data transfer mechanisms would simply make repeated API calls to the other cloud-based system 204 to initiate the sync of the child data object 218 until the syncing of the parent data object 210 successfully completes and the sync of the child data object 218 is able to proceed. These repeated API calls create a significant performance cost that degrades the efficiency of the data syncing process. In particular, due to the poorer performance characteristics of the lower performance synchronization engine 206, without the technical solutions provided by example embodiments of the invention, conventional data transfer scenarios would often result in failed child data object 218 syncs because syncs of the parent data objects 210 would lag behind the child data object 218 syncs performed by higher performance synchronization engine 208. Example embodiments of the invention solve this technical problem of conventional data transfer mechanisms and eliminate the need for multiple, costly API calls to the other cloud-based system 204 by providing a data sync cache to which information is written that indicates whether parent data objects have been successfully synced from the multi-tenant system 202 to the other cloud-based system 204. The higher performance synchronization engine 208 is configured to access the data sync cache and confirm that a parent data object 210 has been successfully synced over before initiating a sync of a corresponding child data object 218, and in this manner, can avoid repeated fail attempts to initiate a sync of the child data object 218 and the corresponding repeated costly API calls to the other cloud-based system 204 associated with conventional data transfer scenarios. The manner in which the higher performance synchronization engine 208 may utilize the data sync cache under different scenarios to enhance the efficiency of the data syncing process will be described hereinafter in reference to FIGS. 3A-7.

Figure 3A:
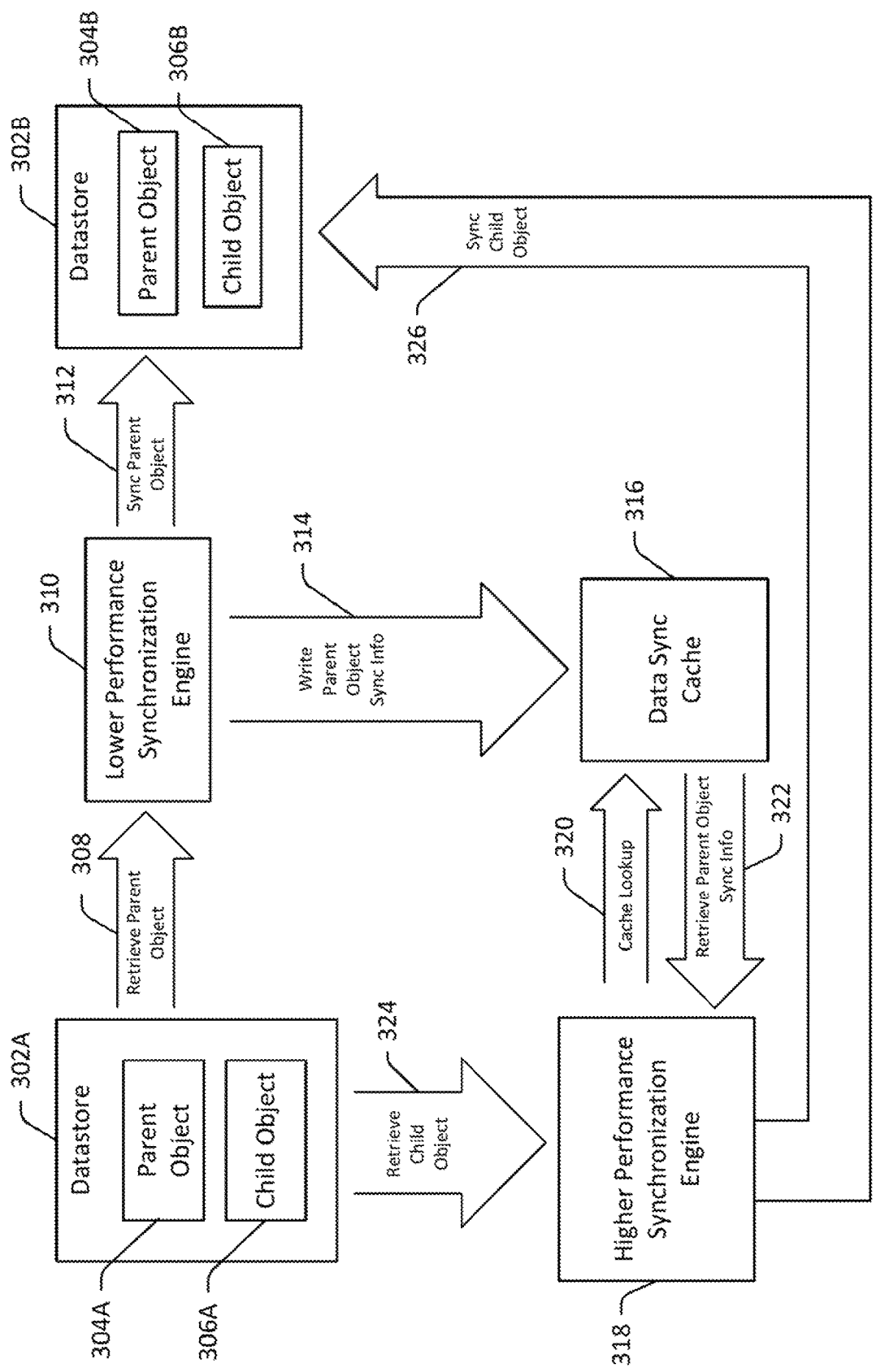
FIG. 3A depicts a scenario involving a cache lookup of a data sync cache for parent data object sync information indicating that a parent data object has been successfully synced from a first computing system to a second computing system and a subsequent syncing of a child data object of the parent data object from the first computing system to the second computing system in accordance with example embodiments of the invention.
Figure 4:
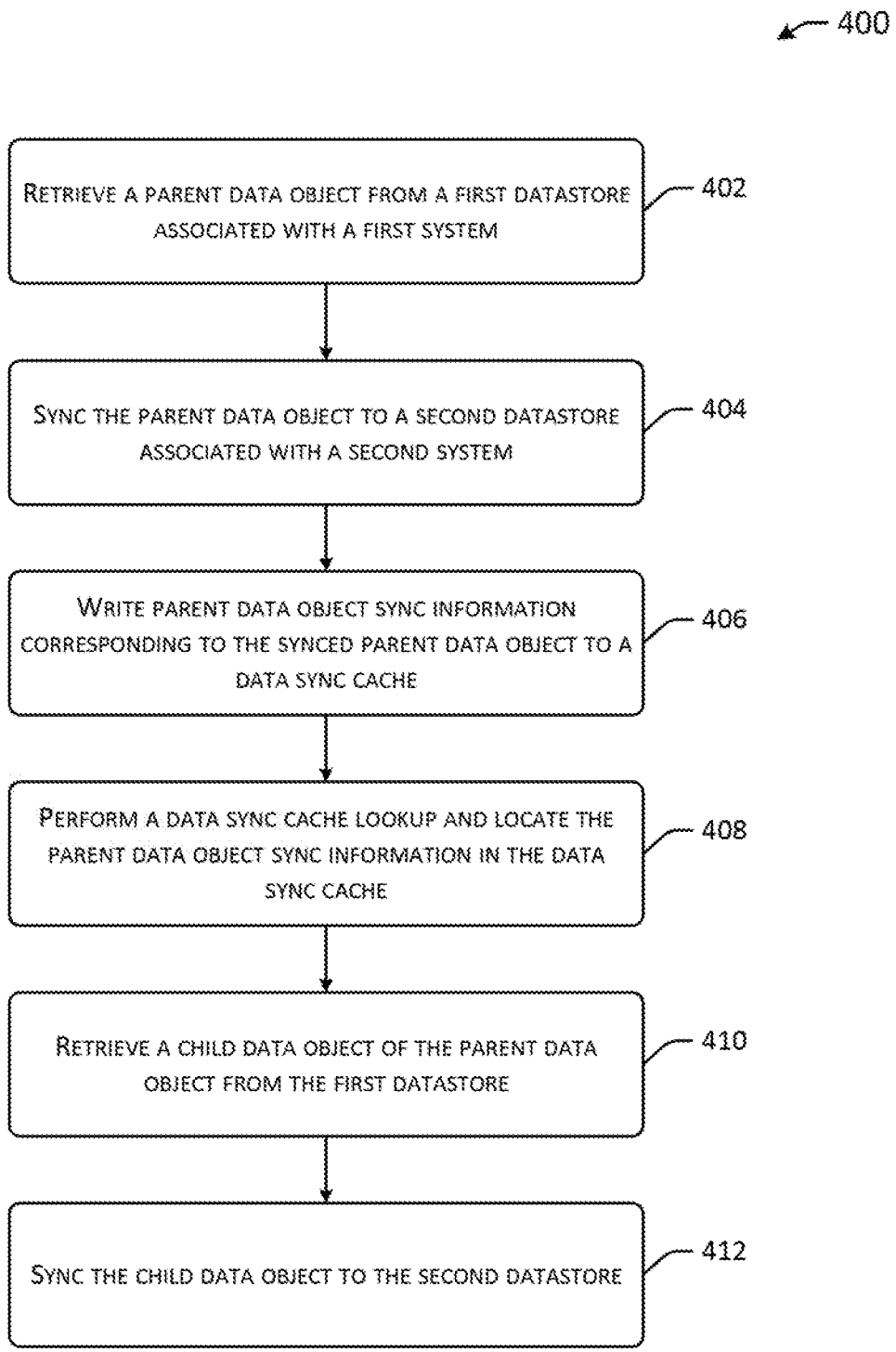
FIG. 4 depicts a flowchart of an illustrative method for syncing a child data object of a parent data object from a first computing system to a second computing system responsive to determining that a data sync cache contains parent data object sync information indicating that the parent data object has been successfully synced from the first computing system to the second computing system in accordance with example embodiments of the invention.

FIG. 3A depicts a scenario involving a cache lookup of a data sync cache for parent data object sync information indicating that a parent data object has been successfully synced from a first computing system to a second computing system and a subsequent syncing of a child data object of the parent data object from the first computing system to the second computing system in accordance with example embodiments of the invention. FIG. 4 depicts a flowchart of an illustrative method 400 involving the example scenario depicted in FIG. 3A. FIGS. 3A and 4 will be described in conjunction with one another hereinafter. The operations of the example method 400 may be performed responsive to execution of software, firmware, and/or hardware of the lower performance synchronization engine 310 and/or the higher performance synchronization engine 318, which may represent particular implementations of the lower performance synchronization engine 206 and the higher performance synchronization engine 208, respectively.

Each operation of any of the methods 400-700 described herein can be performed by one or more of the engines depicted in FIG. 2 and/or FIGS. 3A-3E, whose operation will be described in more detail hereinafter. These engines can be implemented in any combination of hardware, software, and/or firmware. In certain example embodiments, one or more of these engines can be implemented, at least in part, as software and/or firmware program modules that include computer-executable instructions that when executed by a processing circuit cause one or more operations to be performed. In example embodiments, these engines may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 4 in conjunction with FIG. 3A, at block 402 of the method 400, the lower performance synchronization engine 310 may retrieve 308 a parent data object 304A from a first datastore 302A associated with a first computing system. The first datastore 302A may be, for example, the datastore 214 residing on the multi-tenant system 202. In some example embodiments, the datastore 302A may be a logical store encompassing one or more physical datastores. In some example embodiments, portions of the parent data object 304A may be stored across multiple logical stores and/or multiple physical datastores. The parent data object 304A may be one of the parent data objects 210, for example.

At block 404 of the method 400, the lower performance synchronization engine 310 may sync 312 the parent data object 304A to a second datastore 302B associated with a second computing system. After the parent data object 304A is successfully synced to the second computing system, it may be stored as parent data object 304B in the second datastore 302B. The second datastore 302B may be, for example, the datastore 220 residing on the other cloud-based system 204. In some example embodiments, the datastore 302B may be a logical store encompassing one or more physical datastores. In some example embodiments, portions of the parent data object 304B may be stored across multiple logical stores and/or multiple physical datastores. The parent data object 304B may be one of the parent data objects 224, for example.

At block 406 of the method 400, the lower performance synchronization engine 310 may write 314 parent data object sync information corresponding to the synced parent data object 304A/304B to a data sync cache 316. In example embodiments, the parent data object sync information may include an identifier indicating a type of the synced parent data object and a timestamp indicating a time of a most recent modification to the parent data object. In some example embodiments, the timestamp may indicate when the parent data object was last modified. In some example embodiments, the parent data object sync information may additionally, or alternatively, include one or more timestamps indicative of a time at which a most recent sync of the parent data object 304A was initiated, a time at which a most recent sync of the parent data object 304A was completed, or the like. In some example embodiments, the parent data object sync information may further include an identifier indicative of an entity (e.g., a tenant, a customer, a subscriber, etc.) with which the parent data object 304A is associated. In example embodiments, presence of the parent data object sync information in the data sync cache 316 may indicate that the parent data object 304A has been synced from the first computing system to the second computing system as parent data object 304B.

At block 408 of the method 400, prior to attempting to initiate a sync of a child data object 306A of the parent data object 304A, a higher performance synchronization engine 318 may perform a cache lookup 320 of the data sync cache 316 for parent data object sync information indicating that the parent data object 304A has been successfully synced from the first computing system to the second computing system (e.g., from the first datastore 302A to the second datastore 302B). In example embodiments, a cache hit may occur at block 408, whereby, in response to the cache lookup 320, the higher performance synchronization engine 318 may retrieve 322 parent data object sync information from the data sync cache 316 indicating that the parent data object 304A has been successfully synced from the first datastore 302A to the second datastore 302B.

A cache hit is described above as corresponding to the detection/determination of the presence of the parent data object sync information in the data sync cache 316. It should be appreciated, however, that in certain example embodiments, a cache hit may occur or otherwise refer to the absence of the parent data object sync information from the data sync cache 316. Correspondingly, a cache miss may correspond to the presence of the parent data sync information in the data sync cache 316. That is, in some example embodiments, parent object sync information may be present in the data sync cache 316 for each parent data object that has not been synced within a prior threshold period of time, in which case, absence of parent object sync information for a parent data object from the data sync cache 316 may indicate that the parent data object was recently synced successfully, and thus, that syncing of a child data object can proceed.

In response to determining that the parent data object 304A has been successfully synced based on the parent data object sync information retrieved from the data sync cache 316, the higher performance synchronization engine 318 may retrieve the child data object 306A from the first datastore 302A at block 410 of the method 400, and may initiate a sync of the child data object 306A to the second datastore 302B at block 412 of the method 400. Assuming that the child data object 306A is successfully synced from the first computing system to the second computing system, the child data object 306A may be stored as child data object 306B in the second datastore 306B. While the sync of the child data object 306A may still fail due to other factors (e.g., a loss of connectivity with the second computing system), it can be ensured that the sync of the child data object 306A will not fail due to the parent data object 304A not having been previously synced to the second computing system because the parent data object sync information indicating that the parent data object 304A was successfully synced was confirmed to be present in the data sync cache 316.

In some example embodiments, the parent data object sync information may indicate that the parent data object 304A was synced within a threshold amount of time prior to initiation of the sync of the child data object 306A. In some example embodiments, the mere presence of the parent data object sync information in the data sync cache 316 may indicate that the corresponding parent data object 304A was successfully synced within the threshold period of time. For instance, when a threshold period of time has elapsed since the parent data object 304A was synced and the corresponding parent data object sync information was written to the data sync cache 316, the parent data object sync information may be removed from the data sync cache 316. Thus, in such example embodiments, absence of the parent data object sync information from the data sync cache 316 may indicate that the parent data object 304A needs to be synced again before a sync of the child data object 306A can be initiated. In other example embodiments, the higher performance synchronization engine 318 may determine whether the parent data object 304A was last synced within the threshold window of time for initiating a sync of the child data object 306A based on the a timestamp in the parent data object sync information that indicates when the most recent sync of the parent data object 304A was initiated and/or completed. In such example embodiments, when the parent data object 304A is re-synced, the corresponding parent data object sync information stored in the data sync cache 316 may be updated with a timestamp indicative of the most recent sync of the parent data object 304A.

While the example scenario of FIG. 3A (as well as other example scenarios described throughout this disclosure) is illustrated by reference to a particular parent data object of a child data object, it should be appreciated that a child data object may have a respective child dependency to each of multiple parent data objects. In such cases, prior to initiating a sync of the child data object, the higher performance synchronization engine 318 may perform a cache lookup with respect to each parent data object of the child data object to determine if corresponding parent data object sync information is present in the data sync cache that indicates that the parent data object has been successfully synced. In some example embodiments, however, such as those corresponding to the example scenario depicted in FIG. 3D (which will be described in more detail later in this disclosure), the higher performance synchronization engine 318 may not check the data sync cache 316 for parent data object sync information corresponding to one or more parent data objects prior to initiating a sync of a child data object based on an analysis of respective metadata associated with such parent data object(s).

Figure 3B:
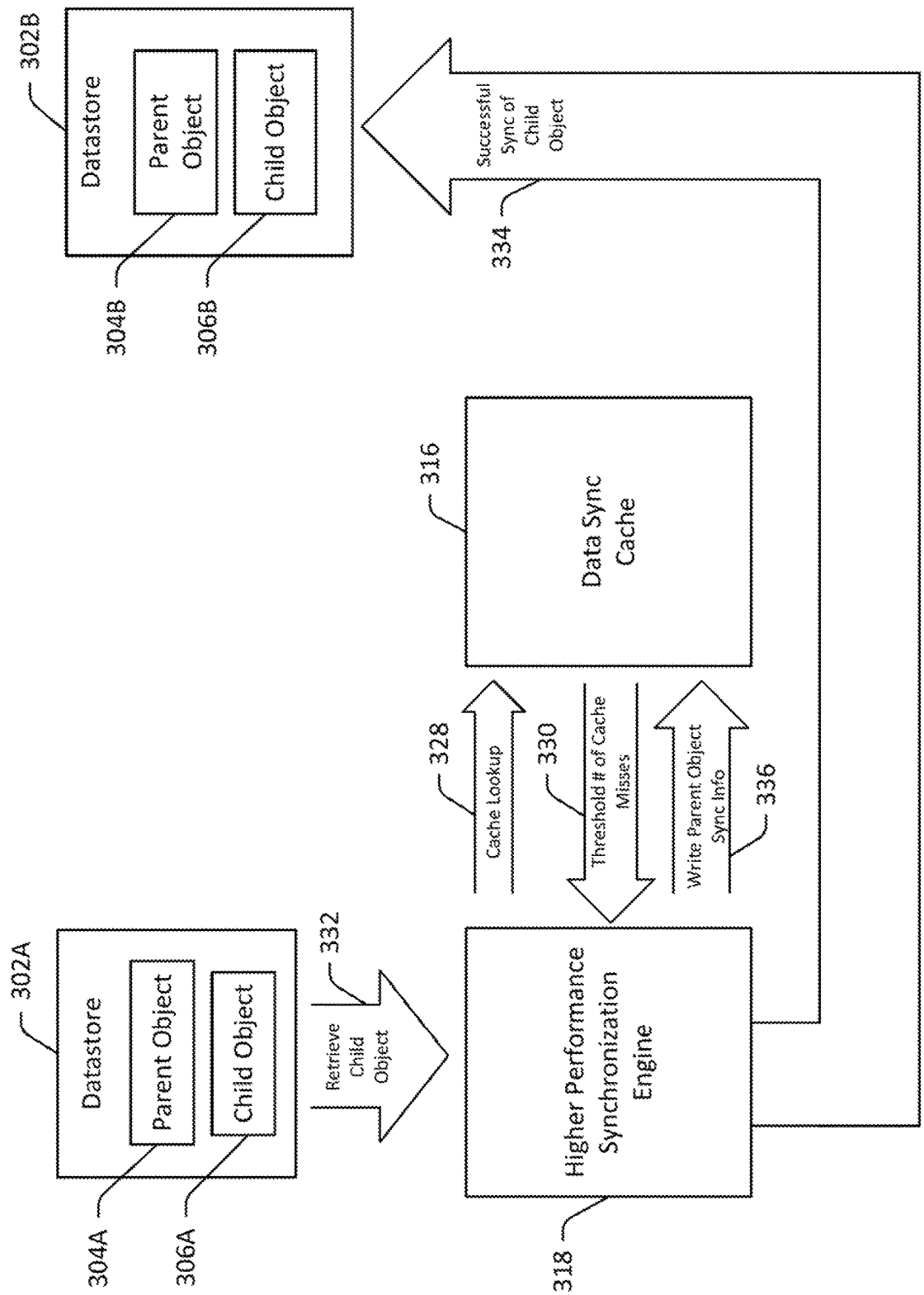
FIG. 3B depicts an alternative scenario involving initiating a sync of the child data object after a threshold number of cache misses have occurred indicating that the data sync cache does not contain the parent data object sync information and subsequent writing of the parent data object sync information to the data sync cache responsive to the child data object being successfully synced in accordance with example embodiments of the invention.
Figure 3C:
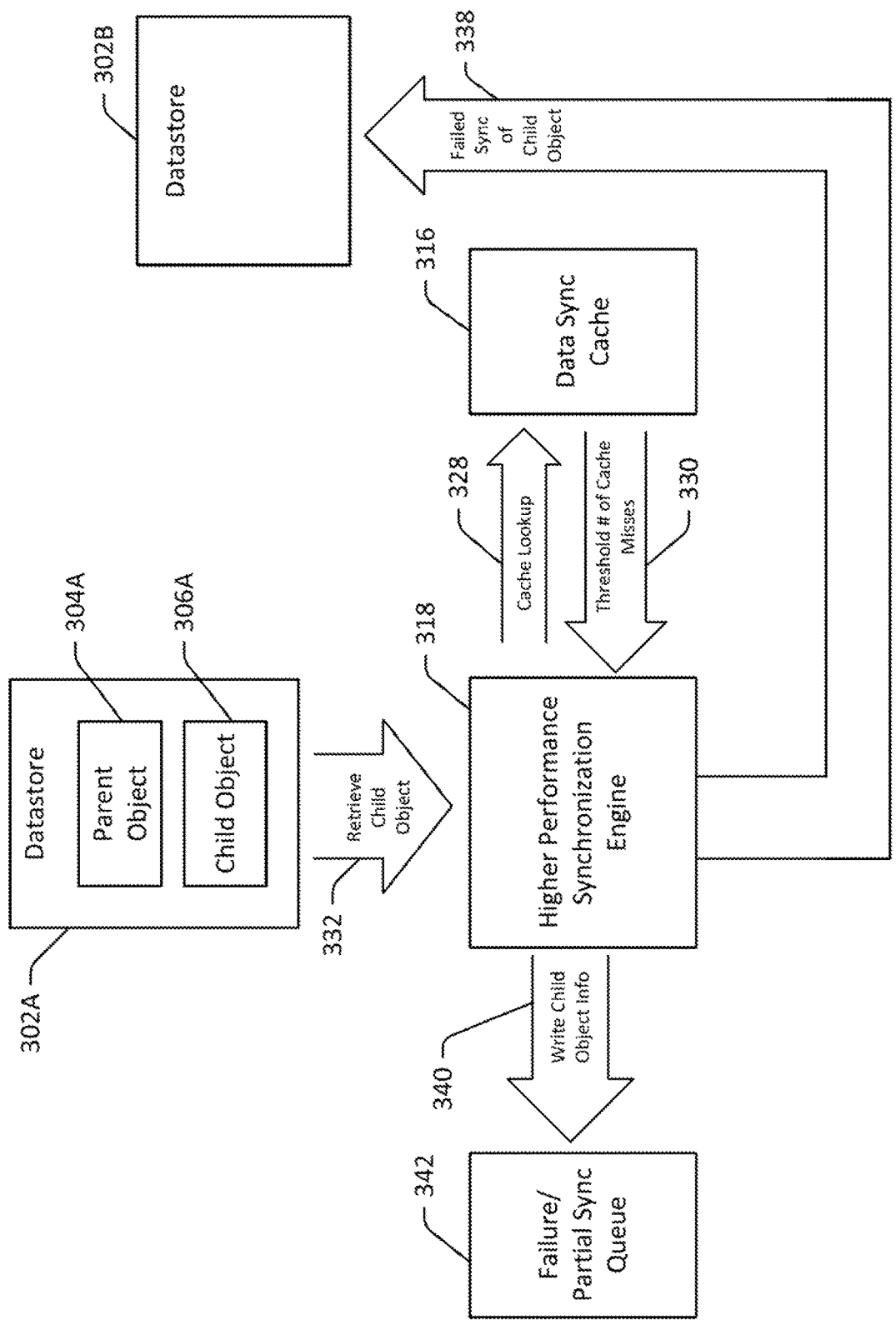
FIG. 3C depicts another alternative scenario involving initiating a sync of the child data object after the threshold number of cache misses and subsequent writing of child data object sync information to a failure/partial sync queue responsive to a failed sync of the child data object in accordance with example embodiments of the invention.
Figure 5:
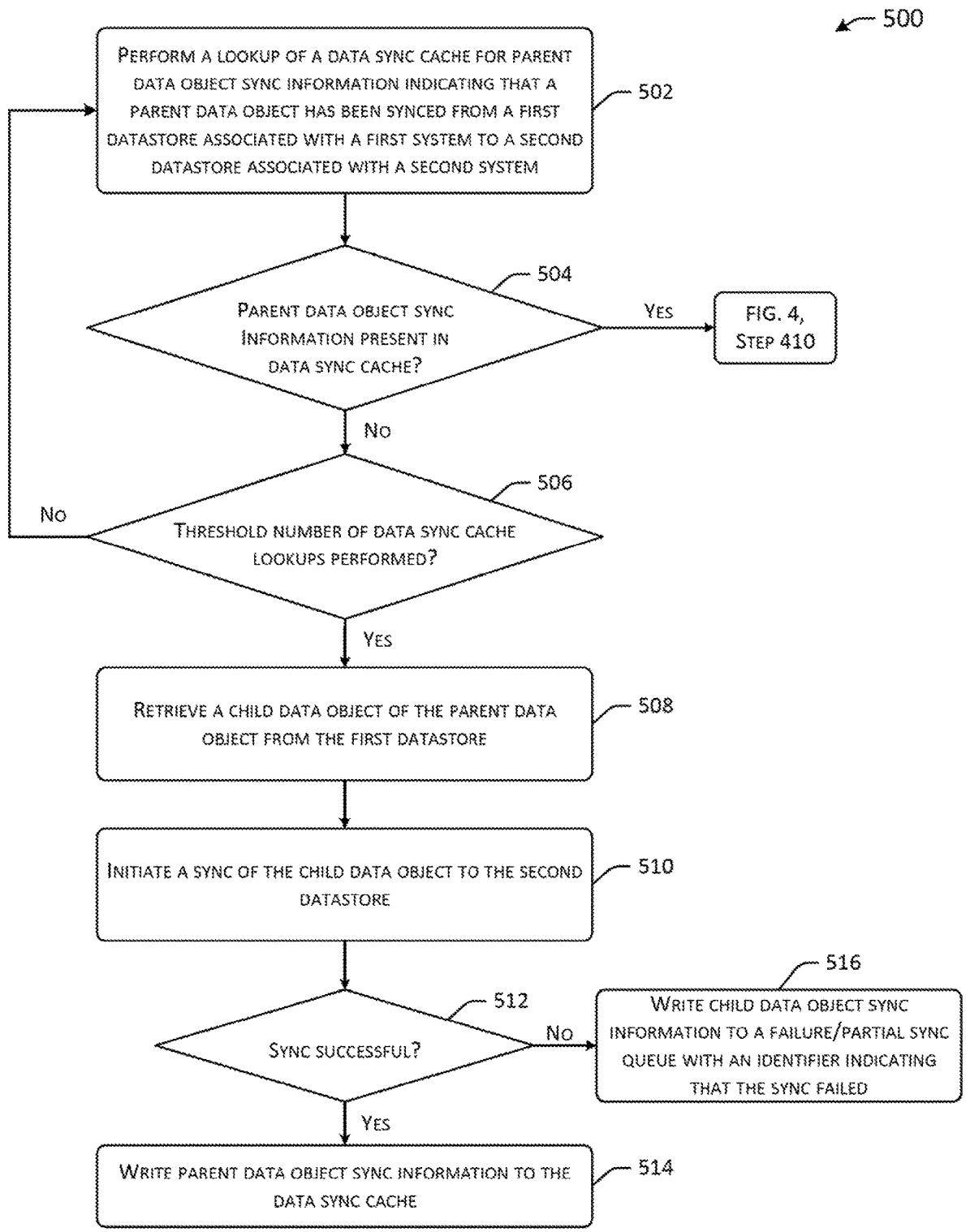
FIG. 5 depicts a flowchart of an illustrative method for initiating a sync of a child data object after a threshold number of cache misses have occurred indicating that the data sync cache does not contain the parent data object sync information and subsequently writing the parent data object sync information to the data sync cache responsive to the child data object being successfully synced in accordance with example embodiments of the invention.

FIG. 3B depicts an alternative scenario involving initiating a sync of the child data object 306A after a threshold number of cache misses indicating that the data sync cache 316 does not contain the parent data object sync information and subsequent writing of the parent data object sync information to the data sync cache 316 responsive to the child data object 306A being successfully synced in accordance with example embodiments of the invention. FIG. 3C depicts another alternative scenario involving initiating a sync of the child data object 306A after the threshold number of cache misses and subsequent writing of child data object sync information to a failure/partial sync queue 342 responsive to a failed sync of the child data object 306A in accordance with example embodiments of the invention. FIG. 5 depicts a flowchart of an illustrative method 500 involving the example scenario of FIG. 3B, or alternatively, the example scenario of FIG. 3C. FIGS. 3B and 3C will each be described in conjunction with FIG. 5 hereinafter.

At block 502 of the method 500, the higher performance data synchronization engine 318 may perform a cache lookup 328 of the data sync cache 316 for the parent data object sync information indicating that the parent data object 304A has been synced from the first datastore 302A to the second datastore 302B. At block 504 of the method 500, the higher performance data synchronization engine 318 may determine whether a cache hit has occurred in response to the cache lookup 328, that is, whether the parent object sync information is present in the data sync cache 316. In response to a positive determination at block 504, the method 500 may proceed from block 410 of the example method 400 of FIG. 4.

On the other hand, in response to a negative determination at block 504, the method 500 may proceed to block 506, where the higher performance data synchronization engine 318 may determine whether a threshold number of cache misses have occurred. Stated another way, the determination at block 506 may correspond to a determination as to whether a threshold number of cache lookups 330 for the parent data object sync information have all resulted in cache misses indicating that the parent data object sync information is not present in the data sync cache 316. In response to a negative determination at block 506, the method 500 may return to block 502, where an additional cache lookup 328 of the data sync cache 316 for the parent data object sync information is performed.

On the other hand, in response to a positive determination at block 506, the method 500 may proceed to block 508, where the higher performance synchronization engine 318 may nonetheless retrieve 332 the child data object 306A from the datastore 302A in preparation for syncing the child data object 306A to the second datastore 302B, which may be initiated at block 510 of the method 500.

At block 512 of the method 500, the higher performance synchronization engine 318 may determine whether the sync of the child data object 306A was successful. That is, at block 512, the higher performance synchronization engine 318 may determine whether the child data object 306A was successfully synced from the first datastore 302A to the second datastore 302B as child data object 306B. In some example embodiments, a positive determination may be made at block 512. In particular, in some example embodiments, parent data object sync information may not be present in the data sync cache 316 despite a corresponding parent data object 304A having been successfully synced to the second computing system. For instance, the lower performance synchronization engine 310 (e.g., a legacy engine) may have performed a most recent sync of the parent data object 304A prior to the engine 310 being configured to write to the data sync cache 316.

Thus, if the sync of the child data object 306A is successful 334 (a positive determination at block 512), then it can be presumed that the parent data object 304A had already been successfully synced despite the absence of corresponding parent data object sync information in the data sync cache 316. As such, responsive to successful syncing 334 of the child data object, the higher performance synchronization engine 318 may, at block 514 of the method 500, write 336 parent data object sync information to the data sync cache 316 indicating that the parent data object 304A has been successfully synced. In this manner, a subsequent cache lookup of the data sync cache 316 for the parent data object sync information would result in a cache hit, and a subsequent sync of the child data object 306A would be able to proceed accordingly.

On the other hand, referring now to FIG. 4 in conjunction with FIG. 3C, if the sync of the child data object 306A fails 338 (a negative determination at block 512), then the method 500 may proceed to block 516, where the higher performance synchronization engine 318 may write 340 child data object sync information to a failure/partial sync queue 342. The child data object sync information may include, for example, an identifier that indicates that the sync of the child data object 306A failed 338. In some example embodiments, the queue 342 may be accessible by the second computing system (e.g., the other cloud-based computing system 204). The second computing system may, for example, request, schedule, or the like re-syncs of child data objects identified in the queue 342 as having failed to sync. If the sync of the child data object 306A is not successful, it may be presumed that the parent data object 304A was not previously successfully synced, and thus, no parent data object sync information may be written to the data sync queue 316.

Figure 3D:
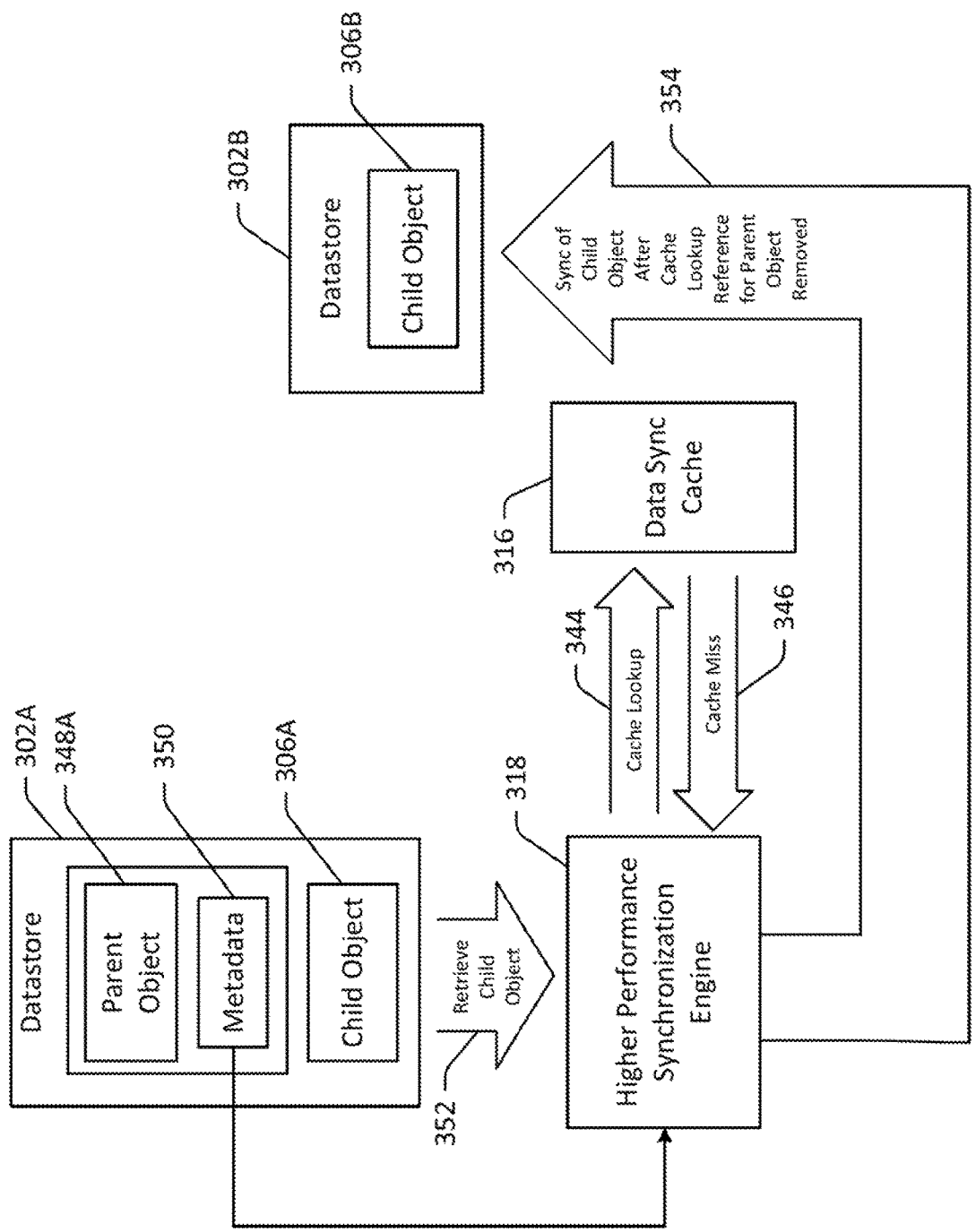
FIG. 3D depicts another alternative scenario involving determining, based on metadata associated with a parent data object, that successful syncing of the parent data object is not required to sync the child data object and initiating a sync of the child data object in accordance with example embodiments of the invention.
Figure 3E:
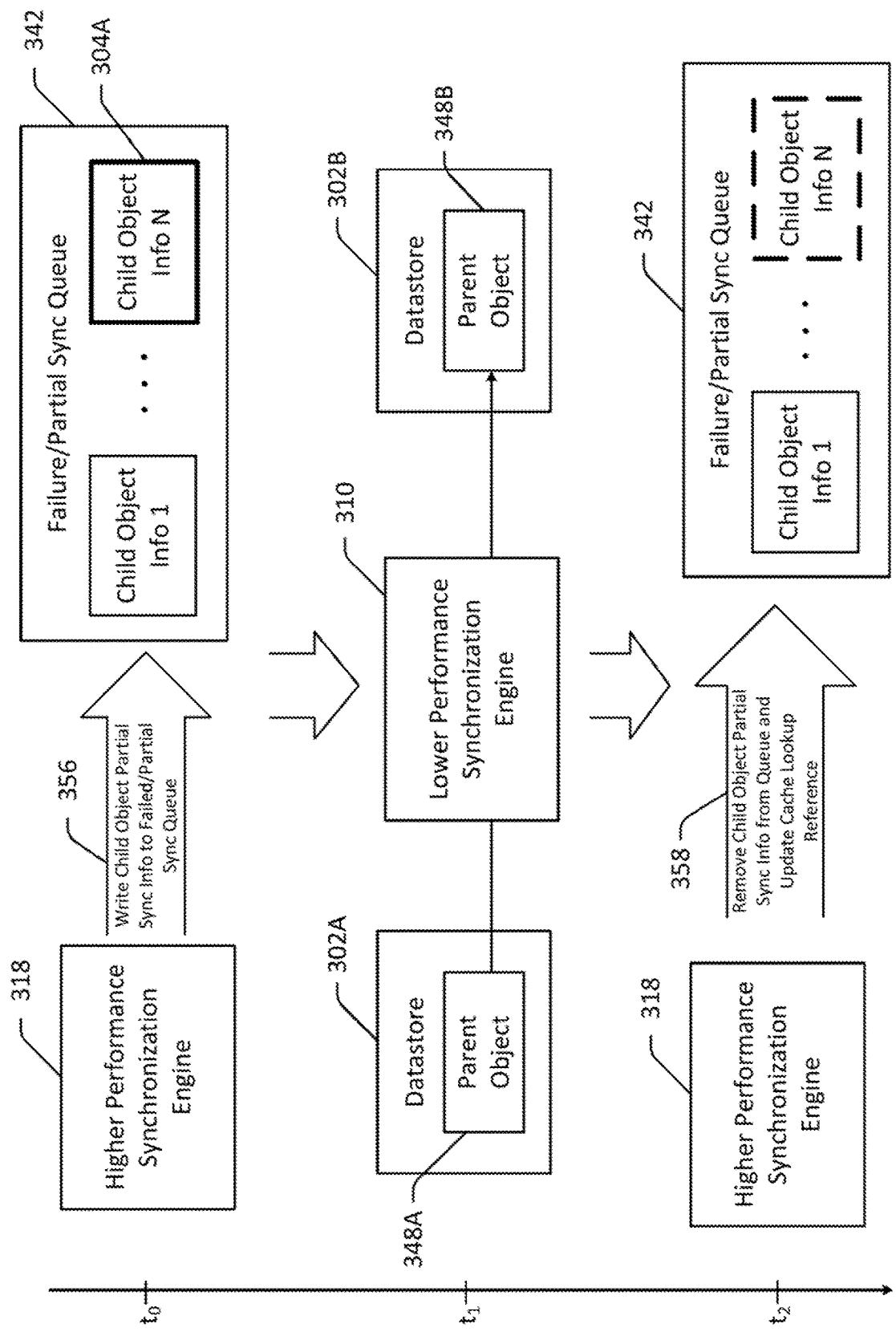
FIG. 3E depicts further aspects of the scenario depicted in FIG. 3D involving writing child data object sync information to the failure/partial sync queue indicating that the sync of the child data object was a partial sync, subsequently determining that the parent data object has successfully synced, and removing the child data object sync information from the queue and updating, for the child data object, a cache lookup reference to the parent data object in accordance with example embodiments of the invention.
Figure 6:
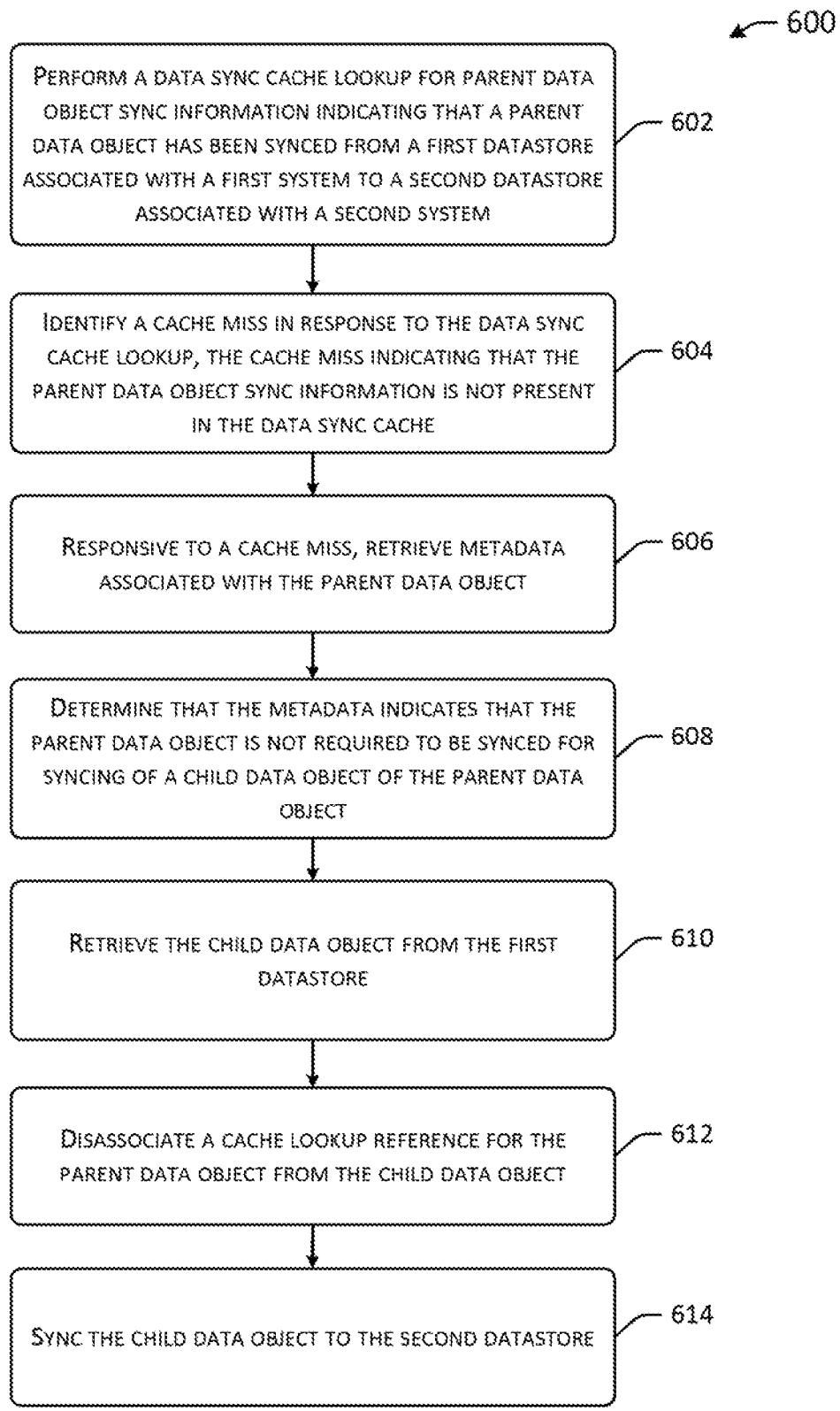
FIG. 6 depicts a flowchart of an illustrative method for initiating a sync of a child data object responsive to determining, based on metadata associated with a parent data object of the child data object, that successful syncing of the parent data object is not required to sync the child data object in accordance with example embodiments of the invention.
Figure 7:
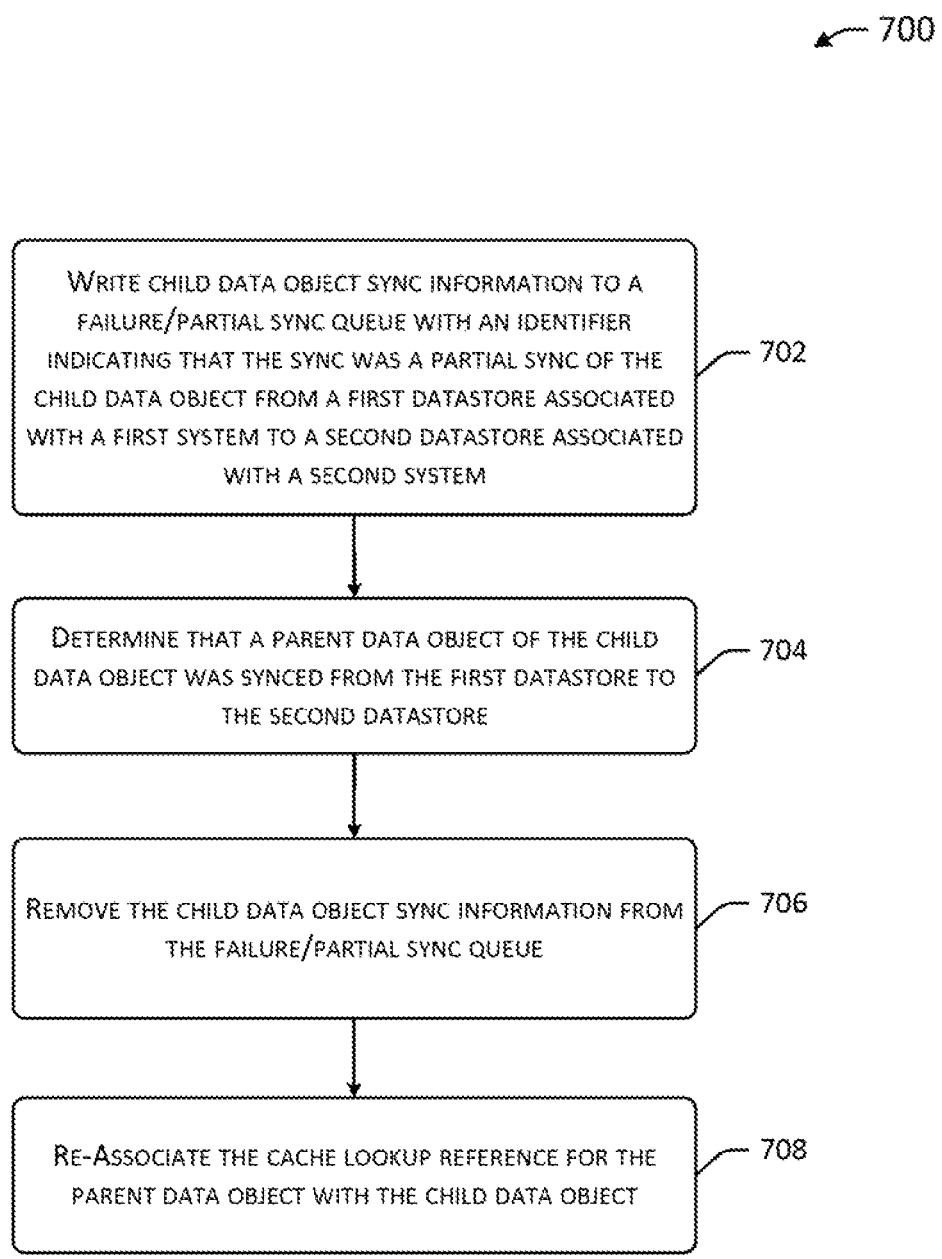
FIG. 7 depicts a flowchart of an illustrative method for writing child data object sync information to the failure/partial sync queue indicating that a sync of the child data object was a partial sync, subsequently determining that the parent data object has successfully synced, and removing the child data object sync information from the queue and updating, for the child data object, a cache lookup reference to the parent data object in accordance with example embodiments of the invention.

FIG. 3D depicts another alternative scenario involving determining, based on metadata associated with a parent data object, that successful syncing of the parent data object is not required to sync the child data object and initiating a sync of the child data object in accordance with example embodiments of the invention. FIG. 6 depicts a flowchart of an illustrative method 600 involving the example scenario of FIG. 3D. FIGS. 3D and 6 will be described in conjunction with one another hereinafter. FIG. 3E depicts further aspects of the scenario depicted in FIG. 3D involving writing child data object sync information to the failure/partial sync queue indicating that the sync of the child data object was a partial sync, subsequently determining that the parent data object has now successfully synced, and removing the child data object sync information from the queue and updating, for the child data object, a cache lookup reference to the parent data object in accordance with example embodiments of the invention. FIG. 7 depicts a flowchart of an illustrative method 700 involving the example scenario of FIG. 3E. FIGS. 3E and 7 will be described in conjunction with one another hereinafter.

In some example embodiments, the child data object 306A may be associated with multiple parent data objects. For instance, the child data object 306A may be a child object to parent data object 304A and parent data object 348A. In some example embodiments, syncing of the parent data object 348A may not be required in order to successfully sync the child data object 306A of the parent data object. For instance, in some example embodiments, while prior syncing of the parent data object 304A may be required in order to successfully sync the child data object 306A, prior syncing of the parent data object 348A may not be required to successfully sync the child data object 306A. For instance, in some example embodiments, a sync of the child data object 306A may complete successfully even if a concurrent syncing of the parent data object 348A has not completed, or in some cases, has not even been initiated.

Referring now to FIG. 6 in conjunction with FIG. 3D, at block 602 of the method 600, the higher performance data synchronization engine 318 may perform a cache lookup 344 of the data sync cache 316 for parent data object sync information indicating that the parent data object 348A has been successfully synced from the first computing system to the second computing system (e.g., from the first datastore 302A associated with the multi-tenant system 202, for example, to the second datastore 302B associated with the other cloud-based system 204, for example). The example method 600 presumes that a cache lookup for parent data object sync information corresponding to the parent data object 304A has already been performed and has result in a cache hit indicating the parent data object sync information is present in the data sync cache 316, and thus, that the parent data object 304A has been successfully synced.

At block 604 of the method 600, the higher performance synchronization engine 318 may identify a cache miss 346 in response to the cache lookup 344, indicating that parent data object sync information corresponding to the parent data object 348A is not present in the data sync cache 316. At block 606 of the method 600, responsive to the cache miss 346, the higher performance synchronization engine 318 may retrieve metadata 350 associated with the parent data object 348A. While the metadata 348A is illustratively shown as being stored in a container that includes the parent data object 348A, it should be appreciated that the metadata 348A may be stored separately from the parent data object 348A in the datastore 302A or another datastore of the first computing system, and linked to the parent data object 348A via a reference or a pointer.

At block 608 of the method 600, the higher performance synchronization engine 318 may analyze the metadata 350 to determine that the metadata 350 indicates that syncing of the parent data object 348A can be ignored (e.g., is not required for successful syncing of the child data object 306A). In some example embodiments, the metadata 350 may include an identifier, a flag, or the like that indicates that the parent data object 348A is not required to be synced in order to proceed with syncing of the child data object 306A. In some example embodiments, the metadata 350 may include a specific value from a range of values such that whether the value is above or below a threshold value indicates whether the corresponding parent data object 348A is required to be synced prior to being able to successfully sync the child data object 306A or whether sync status of the parent data object 348A can be ignored with respect to syncing of the child data object 306A. In some example embodiments, the parent data object 348A may be a parent object to multiple child data objects, and the metadata 350 may include a respective identifier, flag, or the like indicating whether the parent data object 348A is required to be synced or can be ignored for the purpose of syncing each such child data object.

Upon determining that the metadata 350 indicates that the parent data object 348A can be ignored, the higher performance synchronization engine 318 may retrieve 352 the child data object 306A from the datastore 302A at block 610 of the method 600. Then, at block 612 of the method 600, the higher performance synchronization engine 318 may disassociate a cache lookup reference for the parent data object 348A from the child data object 306A, and at block 614 of the method 600, the higher performance synchronization engine 318 may initiate a sync of the child data object 306A from the first datastore 302A to the second datastore 302B.

By disassociating a cache lookup reference for the parent data object 348A from the child data object 306A, subsequent syncs of the child data object 306A may proceed without necessitating a cache lookup of the data sync cache 316 for parent data object sync information corresponding to the parent data object 348A. It should be appreciated that prior to future syncs of the child data object 306A, one or more cache lookups of the data sync cache 316 may still need to be performed with respect to one or more other parent data objects (e.g., the parent data object 304A) of the child data object 306A that are required to have been successfully synced as a prerequisite to successful syncing of the child data object 306A. It should further be appreciated that, in some example embodiments, the higher performance synchronization engine 318 may assess respective metadata associated with each parent data object of the child data object 306A prior to performing a cache lookup of the data sync cache 316 in order to identify which parent data object(s) are required to be synced prior to syncing of the child data object 306A and which parent data object(s) can be ignored.

Further, in some example embodiments, the parent data object 348A may transition from being a sync non-critical" parent data object whose sync criticality status can be ignored for the purposes of syncing the child data object 306A to a "sync critical" parent data object that must be successfully synced as a prerequisite to successful syncing of the child data object 306A. As such, in response to periodic monitoring of the sync criticality status of the parent data object 348A or in response to an otherwise detected change in the sync criticality status of the parent data object 348A, the metadata 350 may be updated to indicate the change in the sync criticality status of the parent data object 348A. For instance, an identifier, flag, code, or the like in the metadata 350 can be modified to indicate a change to the parent data object 348A from a sync non-critical status to a sync critical status. It should be appreciated that parent data objects that are "sync critical" can also change to "sync non-critical" status and the corresponding metadata can be updated to indicate such a change.

Referring now to FIG. 7 in conjunction with FIG. 3E, assuming that the sync of the child data object 306A at block 614 of the method 600 is successful, the higher performance synchronization engine 318 may write 356 child data object sync information to the failure/partial sync queue 342. The child data object sync information may include an identifier, flag, or the like that identifies the sync of the child data object 306A as a partial sync. In some example embodiments, the lower performance synchronization engine 310 may successfully sync the ignored parent data object 348A from the first computing system to the second computing system (e.g., from the first datastore 302A to the second datastore 302B) at some point in time subsequent to the partial sync of the child data object 306A. In response to determining, at block 704 of the method 700, that previously ignored parent data object 348A has been successfully synced (which after syncing may be stored as parent data object 348B in datastore 302B), the higher performance synchronization engine 318 may remove 358, at block 706 of the method 700, the child data object sync information from the failure/partial sync queue 342. In addition, at block 708 of the method 700, the higher performance synchronization engine 318 may re-associate the cache lookup reference for the now synced parent data object 348A with the child data object 306A. In this manner, future syncs of the child data object 306A would again require cache lookups to the data sync cache 316 for parent data object sync information indicating that the parent data object 348A has been successfully synced.

Figure 8:
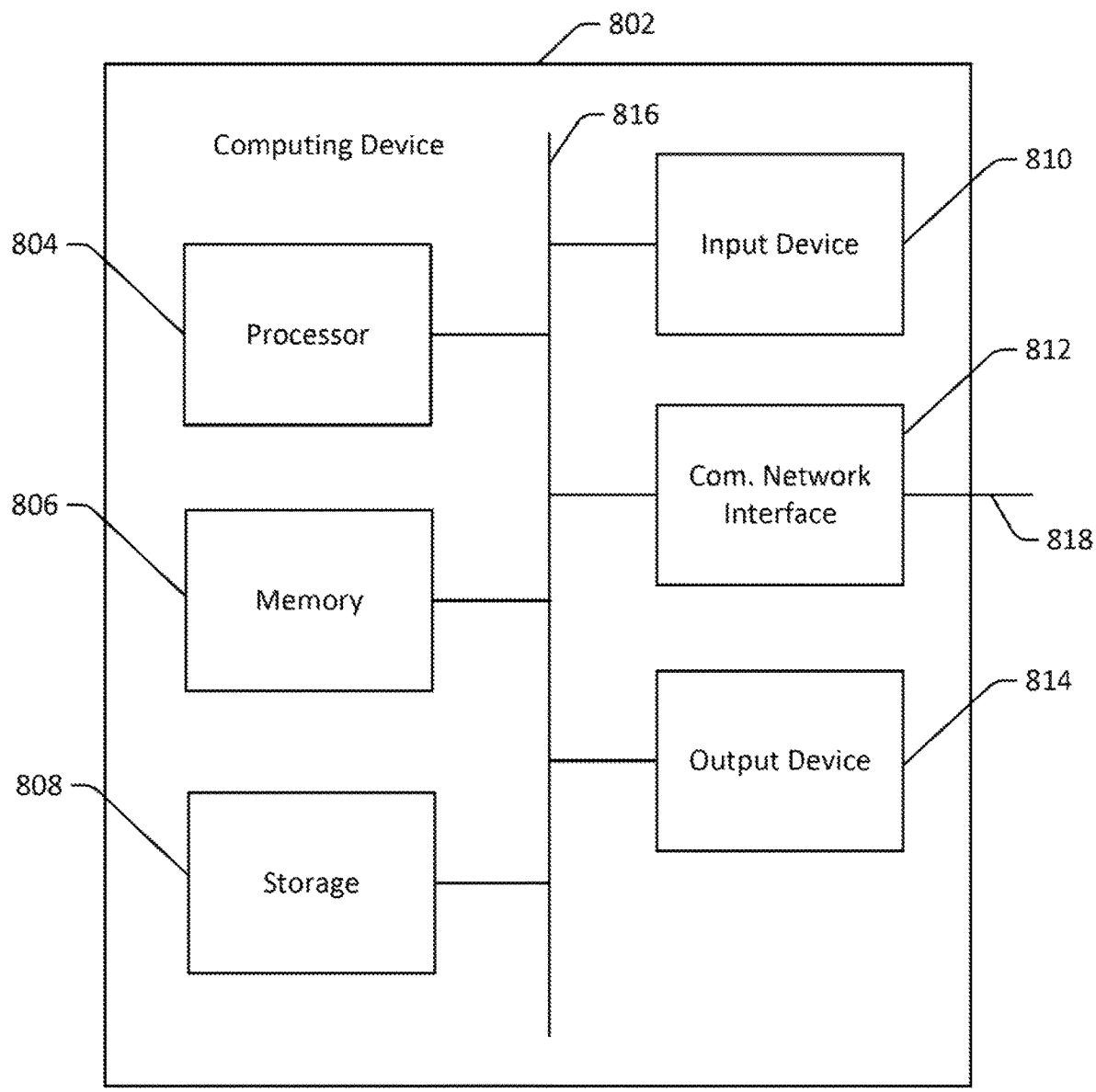
FIG. 8 is a diagram of an example computing device that may form part of a computing system configured to implement features disclosed herein in accordance with example embodiments of the invention.

FIG. 8 depicts a diagram of an example of a computing device 802. Any of the systems, engines, datastores, and/or networks described herein may comprise one or more instances of the computing device 802. In some example embodiments, functionality of the computing device 802 is improved to the perform some or all of the functionality described herein. The computing device 802 comprises a processor 804, memory 806, storage 808, an input device 810, a communication network interface 812, and an output device 814 communicatively coupled to a communication channel 816. The processor 804 is configured to execute executable instructions (e.g., programs). In some example embodiments, the processor 804 comprises circuitry or any processor capable of processing the executable instructions.

The memory 806 stores data. Some examples of memory 806 include storage devices, such as RAM, ROM, RAM cache, virtual memory, etc. In various embodiments, working data is stored within the memory 806. The data within the memory 806 may be cleared or ultimately transferred to the storage 808.

The storage 808 includes any storage configured to retrieve and store data. Some examples of the storage 808 include flash drives, hard drives, optical drives, cloud storage, and/or magnetic tape. Each of the memory system 806 and the storage system 808 comprises a computer-readable medium, which stores instructions or programs executable by processor 804.

The input device 810 is any device that inputs data (e.g., mouse and keyboard). The output device 814 outputs data (e.g., a speaker or display). It will be appreciated that the storage 808, input device 810, and output device 814 may be optional. For example, the routers/switchers may comprise the processor 804 and memory 806 as well as a device to receive and output data (e.g., the communication network interface 812 and/or the output device 814).

The communication network interface 812 may be coupled to a network (e.g., network 108) via the link 818. The communication network interface 812 may support communication over an Ethernet connection, a serial connection, a parallel connection, and/or an ATA connection. The communication network interface 812 may also support wireless communication (e.g., 802.11 a/b/g/n, WiMax, LTE, WiFi). It will be apparent that the communication network interface 812 may support many wired and wireless standards.

It will be appreciated that the hardware elements of the computing device 802 are not limited to those depicted in FIG. 8. A computing device 802 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 804 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A computer-implemented method for syncing data between a first computing system and a second computing system, the method comprising:

performing a first cache lookup of a data sync cache prior to initiating a sync of a first child data object of a first parent data object;

determining, based at least in part on the first cache lookup, that the data sync cache contains first parent data object sync information indicating that the first parent data object has been successfully synced from the first computing system to the second computing system, the first parent data object having been synced by a first sync engine;

retrieving the first child data object from a first datastore associated with the first computing system;

initiating, by a second sync engine different from the first sync engine, the sync of the first child data object to a second datastore associated with the second computing system;

performing one or more second cache lookups of the data sync cache for second parent data object sync information indicating that a second parent data object of a second child data object has been successfully synced from the first computing system to the second computing system;

determining, responsive at least in part to the one or more second cache lookups, that a threshold number of cache misses have occurred, each cache miss indicating that the data sync cache does not contain the second parent data object sync information;

responsive at least in part to determining that the threshold number of cache misses have occurred, retrieving the second child data object from a third datastore associated with the first computing system; and initiating, by the second sync engine, a sync of the second child data object to a fourth datastore associated with the second computing system.

2. The computer-implemented method of claim 1, further comprising prior to performing the first cache lookup of the data sync cache:

retrieving the first parent data object from a fifth datastore associated with the first computing system;

initiating, by the first sync engine, a sync of the first parent data object to a sixth datastore associated with the second computing system;

determining that the first parent data object was successfully synced to the sixth datastore; and writing the first parent data object sync information to the data sync cache.

3. The computer-implemented method of claim 2, wherein the first parent data object sync information comprises a type identifier indicating a type of the first parent data object and a timestamp associated with a most recent successful sync of the first parent data object.

4. The computer-implemented method of claim 1, further comprising:
   determining that the second child data object was successfully synced to the sixth datastore; and
   writing the second parent data object sync information to the data sync cache.

5. The computer-implemented method of claim 1, further comprising:
   determining that the sync of the second child data object failed; and
   writing second child data object sync information to a data structure accessible by the second computing system, the second child data object sync information comprising an identifier indicating that the sync of the second child data object failed.

6. A computer-implemented method for syncing data between a first computing system and a second computing system, the method comprising:
   performing a first cache lookup of a data sync cache prior to initiating a sync of a first child data object of a first parent data object;
   determining, based at least in part on the first cache lookup, that the data sync cache contains first parent data object sync information indicating that the first parent data object has been successfully synced from the first computing system to the second computing system, the first parent data object having been synced by a first sync engine;
   retrieving the first child data object from a first datastore associated with the first computing system;
   initiating, by a second sync engine different from the first sync engine, the sync of the first child data object to a second datastore associated with the second computing system;
   performing a second cache lookup of the data sync cache for second parent data object sync information indicating that a second parent data object of a second child data object has been successfully synced from the first computing system to the second computing system;
   identifying a cache miss responsive at least in part to the second cache lookup, the cache miss indicating that the second parent data object sync information is not present in the data sync cache;
   retrieving metadata associated with the second parent data object;
   determining that the metadata indicates that syncing of the second parent data object is not required to successfully sync the second child data object; and
   disassociating a data sync cache lookup reference for the second parent data object from the second child data object such that subsequent syncs of the second child data object proceed without requiring cache lookups for the second parent data object sync information.

7. The computer-implemented method of claim 6, further comprising:
   determining that the second child data object was successfully synced; and
   writing second child data object sync information to a queue, the second child data object sync information comprising an identifier indicating that the sync of the second child data object was a partial sync.

8. The computer-implemented method of claim 7, further comprising:
   determining that the second parent data object was successfully synced from the first computing system to the second computing system; and
   removing the second child data object sync information from the queue; and
   re-associate the data sync cache lookup reference for the second parent data object with the second child data object responsive at least in part to determining that the second parent data object was successfully synced.

9. The computer-implemented method of claim 8, further comprising re-associating the data sync cache lookup reference for the second parent data object with the second child data object responsive at least in part to determining that the second parent data object was successfully synced.

10. A system configured to perform data syncs, the system comprising:
    at least one processor; and
    at least one memory storing computer-executable instructions, wherein the at least one processor is configured to access the at least one memory and execute the computer-executable instructions to:
      perform a first cache lookup of a data sync cache prior to initiating a sync of a first child data object of a first parent data object;
      determine, based at least in part on the first cache lookup, that the data sync cache contains first parent data object sync information indicating that the first parent data object has been successfully synced from the first computing system to the second computing system, the first parent data object having been synced by a first sync engine;
      retrieve the first child data object from a first datastore associated with the first computing system;
      initiate, by a second sync engine different from the first sync engine, the sync of the first child data object to a second datastore associated with the second computing system;
      perform one or more second cache lookups of the data sync cache for second parent data object sync information indicating that a second parent data object of a second child data object has been successfully synced from the first computing system to the second computing system;
      determine, responsive at least in part to the one or more second cache lookups, that a threshold number of cache misses have occurred, each cache miss indicating that the data sync cache does not contain the second parent data object sync information;
      responsive at least in part to determining that the threshold number of cache misses have occurred, retrieve the second child data object from a third datastore associated with the first computing system; and
      initiate, by the second sync engine, a sync of the second child data object to a fourth datastore associated with the second computing system.

11. The system of claim 10, wherein, prior to performing the first cache lookup of the data sync cache, the at least one processor is further configured to execute the computer-executable instructions to:
    retrieve the first parent data object from a fifth datastore associated with the first computing system;

initiate, by the first sync engine, a sync of the first parent data object to a sixth datastore associated with the second computing system;

determine that the first parent data object was successfully synced to the sixth datastore; and write the first parent data object sync information to the data sync cache.

12. The system of claim 11, wherein the first parent data object sync information comprises a type identifier indicating a type of the first parent data object and a timestamp associated with a most recent successful sync of the first parent data object.

13. The system of claim 10, wherein the at least one processor is further configured to execute the computer-executable instructions to:

determine that the second child data object was successfully synced to the sixth datastore; and write the second parent data object sync information to the data sync cache.

14. The system of claim 10, wherein the at least one processor is further configured to execute the computer-executable instructions to:

determine that the sync of the second child data object failed; and write second child data object sync information to a data structure accessible by the second computing system, the second child data object sync information comprising an identifier indicating that the sync of the second child data object failed.

15. The system of claim 10, wherein the first sync engine provides poorer performance than the second sync engine with respect to one or more performance metrics.

16. A system configured to perform data syncs, the system comprising:

at least one processor; and at least one memory storing computer-executable instructions, wherein the at least one processor is configured to access the at least one memory and execute the computer-executable instructions to:

perform a first cache lookup of a data sync cache prior to initiating a sync of a first child data object of a first parent data object;

determine, based at least in part on the first cache lookup, that the data sync cache contains first parent data object sync information indicating that the first parent data object has been successfully synced from the first computing system to the second computing system, the first parent data object having been synced by a first sync engine;

retrieve the first child data object from a first datastore associated with the first computing system;

initiate, by a second sync engine different from the first sync engine, the sync of the first child data object to a second datastore associated with the second computing system;

perform a second cache lookup of the data sync cache for second parent data object sync information indicating that a second parent data object of a second child data object has been successfully synced from the first computing system to the second computing system;

identify a cache miss responsive at least in part to the second cache lookup, the cache miss indicating that the second parent data object sync information is not present in the data sync cache;

retrieve metadata associated with the second parent data object;

determine that the metadata indicates that syncing of the second parent data object is not required to successfully sync the second child data object; and disassociate a data sync cache lookup reference for the second parent data object from the second child data object such that subsequent syncs of the second child data object proceed without requiring cache lookups for the second parent data object sync information.

17. The system of claim 16, wherein the at least one processor is further configured to execute the computer-executable instructions to:

determine that the second child data object was successfully synced; and write second child data object sync information to a queue, the second child data object sync information comprising an identifier indicating that the sync of the second child data object was a partial sync.

18. The system of claim 17, wherein the at least one processor is further configured to execute the computer-executable instructions to:

determine that the second parent data object was successfully synced from the first computing system to the second computing system;

remove the second child data object sync information from the queue; and re-associate the data sync cache lookup reference for the second parent data object with the second child data object responsive at least in part to determining that the second parent data object was successfully synced.

19. A computer program product for syncing data between a first computing system and a second computing system, the computer program product comprising a non-transitory computer-readable medium readable by a processing circuit, the non-transitory computer-readable medium storing instructions executable by the processing circuit to cause a method to be performed, the method comprising:

performing a first cache lookup of a data sync cache prior to initiating a sync of a first child data object of a first parent data object;

determining, based at least in part on the first cache lookup, that the data sync cache contains first parent data object sync information indicating that the first parent data object has been successfully synced from the first computing system to the second computing system, the first parent data object having been synced by a first sync engine;

retrieving the first child data object from a first datastore associated with the first computing system;

initiating, by a second sync engine different from the first sync engine, the sync of the first child data object to a second datastore associated with the second computing system;

performing one or more second cache lookups of the data sync cache for second parent data object sync information indicating that a second parent data object of a second child data object has been successfully synced from the first computing system to the second computing system;

determining, responsive at least in part to the one or more second cache lookups, that a threshold number of cache misses have occurred, each cache miss indicating that the data sync cache does not contain the second parent data object sync information;

responsive at least in part to determining that the threshold number of cache misses have occurred, retrieving the second child data object from a third datastore associated with the first computing system; and initiating, by the second sync engine, a sync of the second child data object to a fourth datastore associated with the second computing system.

\* \* \* \* \*